(12) United States Patent
Yoshikaie et al.

(10) Patent No.: US 10,574,851 B2
(45) Date of Patent: Feb. 25, 2020

(54) IMAGE SCANNING APPARATUS

(71) Applicant: SEIKO EPSON CORPORATION, Tokyo (JP)

(72) Inventors: Kazuya Yoshikaie, Fukuoka (JP); Masatomo Kanamitsu, Fukuoka (JP); Wataru Beppu, Fukuoka (JP); Keisuke Miyauchi, Fukuoka (JP); Hiromichi Kitsuki, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/830,251

(22) Filed: Dec. 4, 2017

(65) Prior Publication Data

US 2018/0198943 A1  Jul. 12, 2018

(30) Foreign Application Priority Data

Jan. 6, 2017 (JP) ................................. 2017-000919

(51) Int. Cl.
*H04N 1/047* (2006.01)
*H04N 1/12* (2006.01)
*H04N 1/00* (2006.01)

(52) U.S. Cl.
CPC ......... *H04N 1/047* (2013.01); *H04N 1/00588* (2013.01); *H04N 1/00602* (2013.01); *H04N 1/121* (2013.01)

(58) Field of Classification Search
None
See application file for complete search history.

(56) References Cited

U.S. PATENT DOCUMENTS

| | | | |
|---|---|---|---|
| 2006/0164695 A1* | 7/2006 | Tokutsu | H04N 1/0057 358/498 |
| 2013/0003136 A1 | 1/2013 | Osakabe et al. | |
| 2013/0077137 A1* | 3/2013 | Nishikawa | H04N 1/00588 358/498 |
| 2013/0201646 A1* | 8/2013 | Braun | H05K 5/0282 361/784 |
| 2014/0061998 A1 | 3/2014 | Kasashima et al. | |
| 2015/0356366 A1* | 12/2015 | Jones | G06K 9/60 382/135 |

FOREIGN PATENT DOCUMENTS

| | | |
|---|---|---|
| JP | 2013-014391 A | 1/2013 |
| JP | 2014-047050 A | 3/2014 |

* cited by examiner

*Primary Examiner* — Frantz Bataille
(74) *Attorney, Agent, or Firm* — Global IP Counselors, LLP

(57) ABSTRACT

When consecutively feeding a plurality of media, an image scanning apparatus, according to the length of a preceding medium in a feed direction, changes the feed control for feeding the succeeding medium.

7 Claims, 22 Drawing Sheets

IMAGE SCANNING APPARATUS

BACKGROUND

1. Technical Field

The present invention relates to an image scanning apparatus that scans images.

2. Related Art

A scanner, an example of an image scanning apparatus, will be described below. A scanner is equipped with a feeding apparatus (auto document feeder (ADF)) that automatically feeds documents, an example of a medium, and is therefore configured to be capable of automatically feeding and scanning a plurality of documents (see, e.g., JP-A-2014-47050).

When a plurality of documents are consecutively transported, minimization of the interval between a preceding document and the succeeding document provides advantages from the viewpoint of throughput. Therefore, it is conceivable to increase the document transport speed in at least a document transport region that is upstream of an image scanning sensor. However, for example, in the case where in order to adjust the interval between a preceding document and the succeeding document, a control of stopping transport rollers is attempted, there is possibility that the transport roller stopping control cannot be carried out in time if the document sheet length is short. In such a case, the document interval may become intentionally and inconveniently short and, at worst, documents may overlap.

SUMMARY

An advantage of some aspects of the invention is that an image scanning apparatus capable of appropriately adjusting the interval between a preceding document and the succeeding document while improving throughput is provided.

One aspect of the invention provides an image scanning apparatus that includes a medium mount portion on which one or more media are mounted, a feeder unit that feeds the media from the medium mount portion, a separator unit that faces the feeder unit and that separates the media, a transporter unit that is provided at a downstream side of the feeder unit and the separator unit and that transports the media, a scanning unit that is provided at the downstream side of the transporter unit and that scans the media, and a control unit that controls the feeder unit and the transporter unit. When a plurality of media are fed, the control unit, according to a length of a first medium that is a preceding medium, the length being a dimension in a feed direction, changes a feed speed for feeding a second medium that succeeds the first medium by using the feeder unit.

According to this aspect of the invention, when a plurality of media are consecutively fed, the control unit changes the feed speed for feeding the succeeding second medium by using the feeder unit, according to the length of the preceding first medium in the feed direction. Therefore, it is possible to inhibit a failure in adjustment of the document interval associated with different lengths of documents and therefore appropriately adjust the document interval while improving throughput.

In the foregoing image scanning apparatus, where a feed speed of a medium by the feeder unit before a leading end of the medium passes the separator unit is a speed Va and a feed speed of the medium by the feeder unit after the leading end of the medium passes the separator unit is a speed Vb, the control unit may set the speed Vb to a speed Vb1 that is higher than the speed Va when the length of the first medium in the feed direction is greater than a predetermined length L and may set the speed Vb to a speed Vb2 that is lower than the speed Vb1 when the length of the first medium in the feed direction is less than or equal to the length L.

According to this embodiment of the foregoing aspect of the invention, since the control unit sets the speed Vb to the speed Vb1 that is higher than the speed Va when the length of the first medium in the feed direction is greater than the predetermined length L and sets the speed Vb to the speed Vb2 that is lower than the speed Vb1 when the length of the first medium in the feed direction is less than or equal to the length L, it is possible to appropriately control the document interval by setting the speed Vb to the speed Vb2 that is lower than the speed Vb1 when the length of the first medium in the feed direction is less than or equal to the length L.

The image scanning apparatus according to the foregoing embodiment may further include a first detection unit that is provided on the medium transport path between the feeder unit and the transporter unit and that detects a medium and a second detection unit that is provided on the medium transport path at the downstream side of the transporter unit and that detects the medium. The control unit may calculate the length of the first medium in the feed direction based on an amount of transport of the first medium in a period from when the leading end of the first medium is detected by the second detection unit to when a tailing end of the first medium is detected by the first detection unit and a path length between the first detection unit and the second detection unit.

According to this embodiment, since the control unit calculates the length of the first medium in the feed direction based on the amount by which the first medium is transported in the period from when the leading end of the first medium is detected by the second detection unit to when the tailing end of the first medium is detected by the first detection unit and the path length between the first detection unit and the second detection unit, it is possible to more accurately control the interval between a preceding document and the succeeding document.

In the image scanning apparatus according to either one of the foregoing embodiments, the length L may be set according to a size of a short side of a card prescribed by International Standard Organization ISO/IEC 7810 ID-1.

This embodiment achieves the advantages of any one of the foregoing aspect and embodiments of the invention when the card prescribed by the International Standard Organization ISO/IEC 7810 ID-1 is transported with its short side aligned along the transport direction.

A second aspect of the invention provides an image scanning apparatus that includes a medium mount portion on which one or more media are mounted, a feeder unit that feeds the media from the medium mount portion, a separator unit that faces the feeder unit and that separates the media, a transporter unit that is provided at a downstream side of the feeder unit and the separator unit and that transports the media, a scanning unit that is provided at the downstream side of the transporter unit and that scans the media, and a control unit that controls the feeder unit and the transporter unit. When a plurality of media are fed, the control unit, according to a characteristic of a first medium that is a preceding medium, changes a feed speed for feeding a second medium that succeeds the first medium by using the feeder unit.

According to this aspect of the invention, when a plurality of media are consecutively fed, the control unit changes the feed speed for feeding the succeeding second medium by using the feeder unit, according to the characteristic of the preceding first medium. Therefore, it is possible to inhibit a failure in adjustment of the document interval associated with a difference in the characteristic between documents and therefore appropriately adjust the document interval while improving throughput.

In the image scanning apparatus according to the second aspect of the invention, where a feed speed of a medium by the feeder unit before a leading end of the medium passes the separator unit is a speed Va and a feed speed of the medium by the feeder unit after the leading end of the medium passes the separator unit is a speed Vb, the control unit may set the speed Vb to a speed Vb1 that is higher than the speed Va when a thickness of the first medium is greater than a predetermined thickness t and may set the speed Vb to a speed Vb2 that is lower than the speed Vb1 when the thickness of the first medium is less than or equal to the thickness t.

According to this embodiment, since the control unit sets the speed Vb to the speed Vb1 that is higher than the speed Va when the thickness of the first medium is greater than the predetermined thickness t and sets the speed Vb to the speed Vb2 that is lower than the speed Vb1 when the thickness of the first medium is less than or equal to the thickness t, it is possible to appropriately control the document interval by setting the speed Vb to the speed Vb2 that is lower than the speed Vb1 when the thickness of the first medium is less than or equal to the thickness t.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
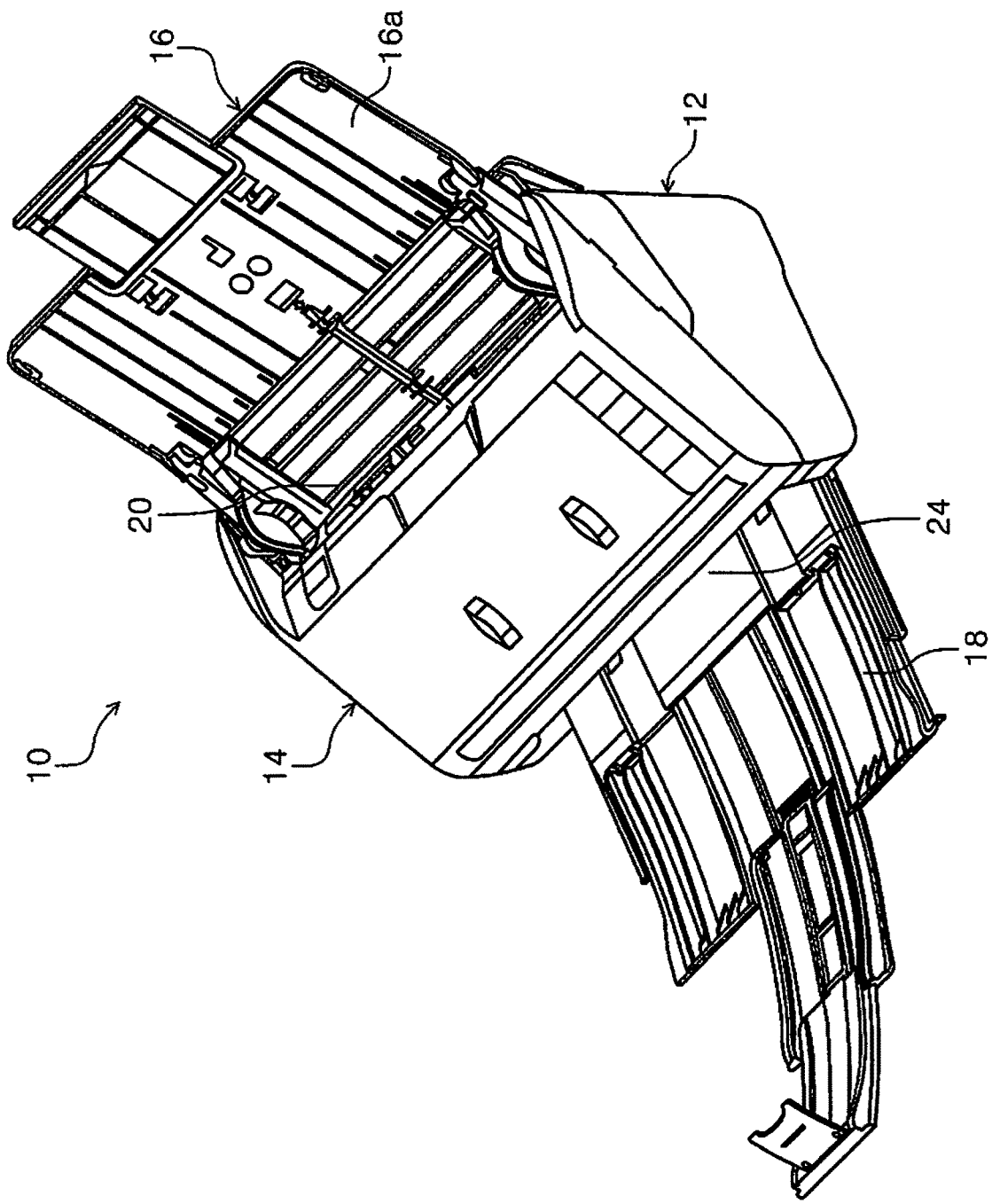
FIG. 1 is an external perspective view of a scanner according to the invention.
Figure 2:
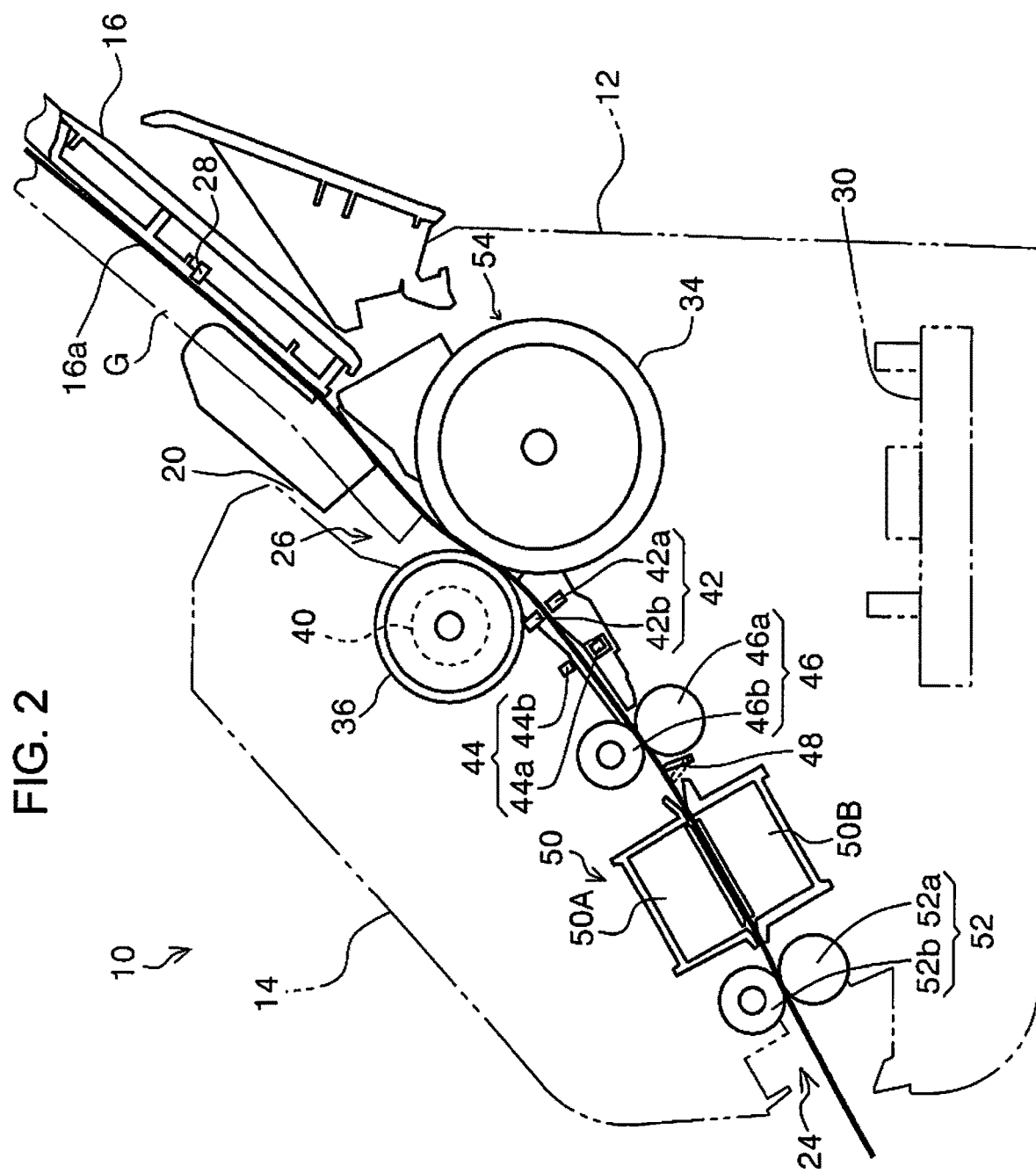
FIG. 2 is a side view illustrating a medium feeding path of the scanner according to the invention.
Figure 10:
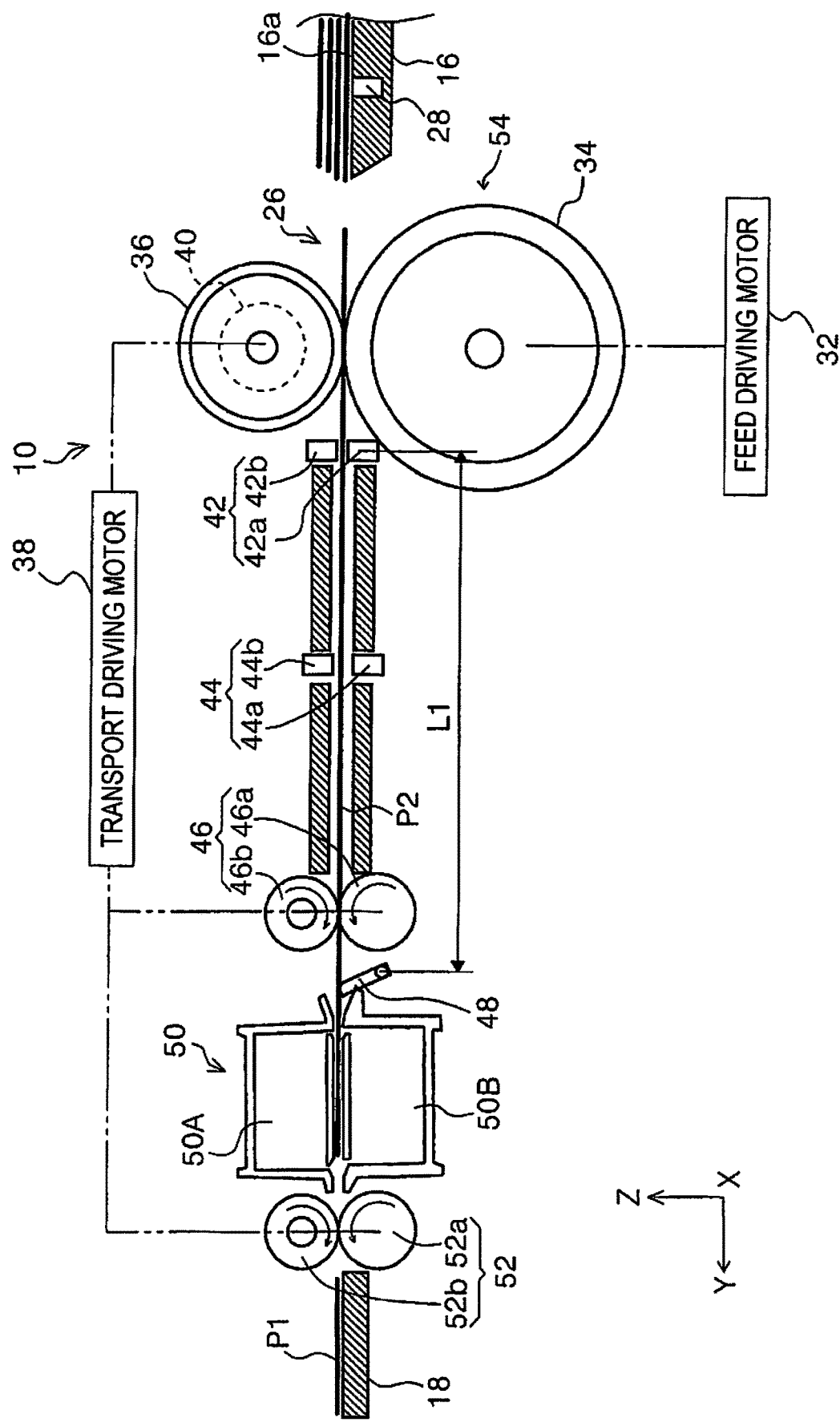
FIG. 10 is a schematic diagram of the feeding path, illustrating a feeding state in the first feed control.
Figure 11:
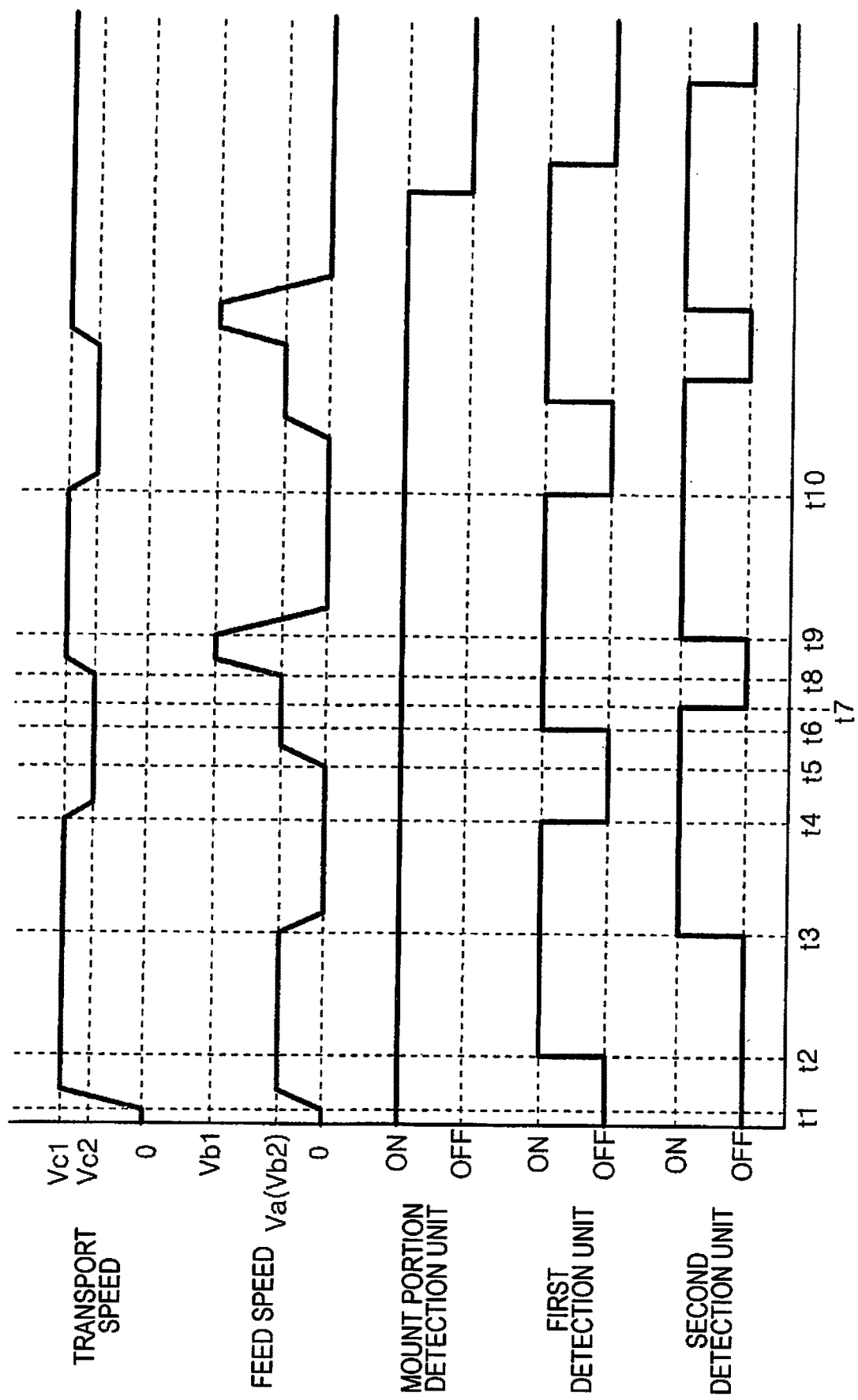
FIG. 11 is a timing chart of the first feed control.

FIG. 1 is an external perspective view of a scanner according to the invention. FIG. 2 is a side view illustrating a medium feeding path of the scanner according to the invention. FIGS. 3 to 10 are schematic diagrams of a feeding path, illustrating transition of feeding state in a first feed control in a stepwise manner. FIG. 11 is a timing chart of the first feed control.

Figure 18:
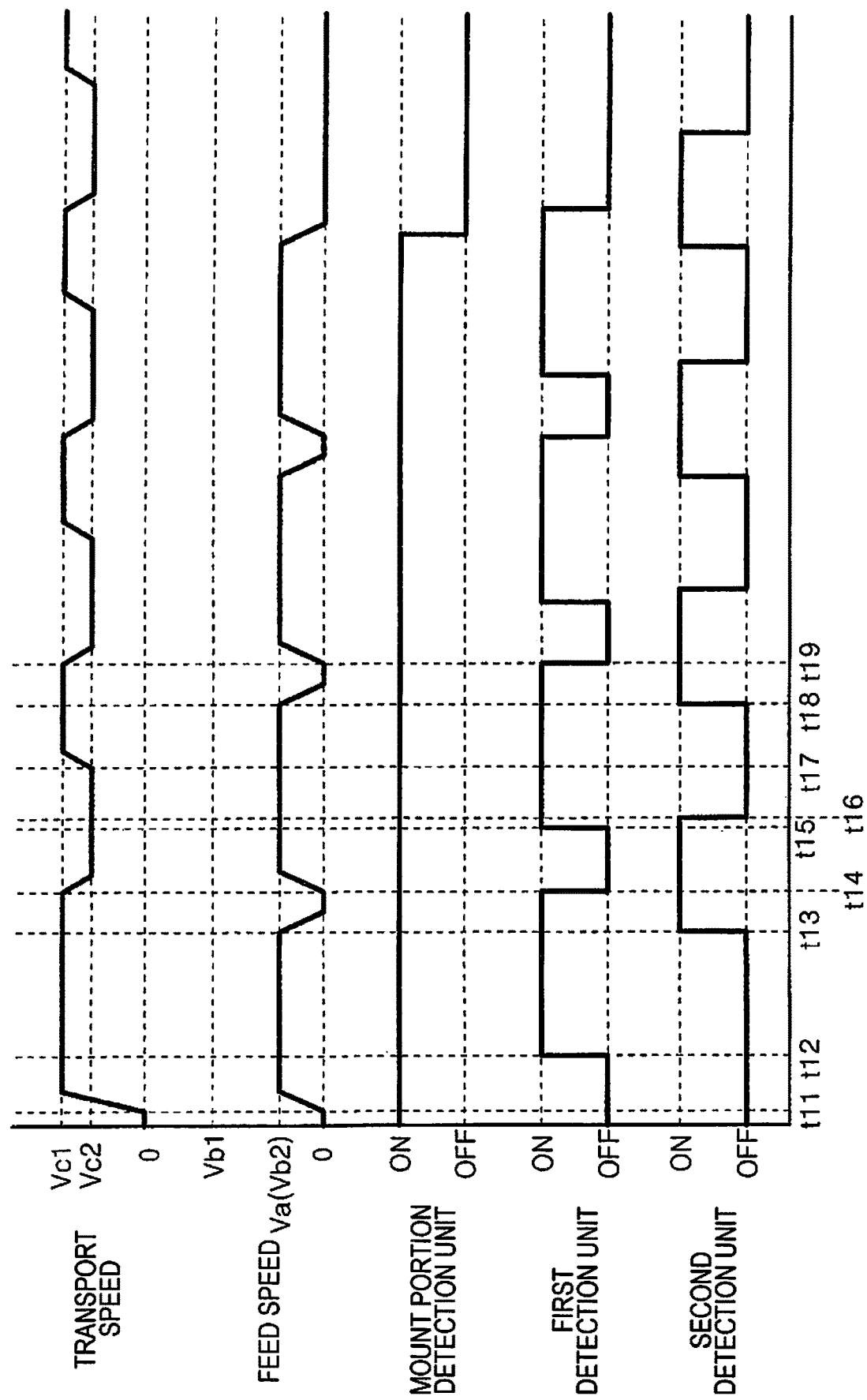
FIG. 18 is a timing chart of the second feed control.
Figure 19:
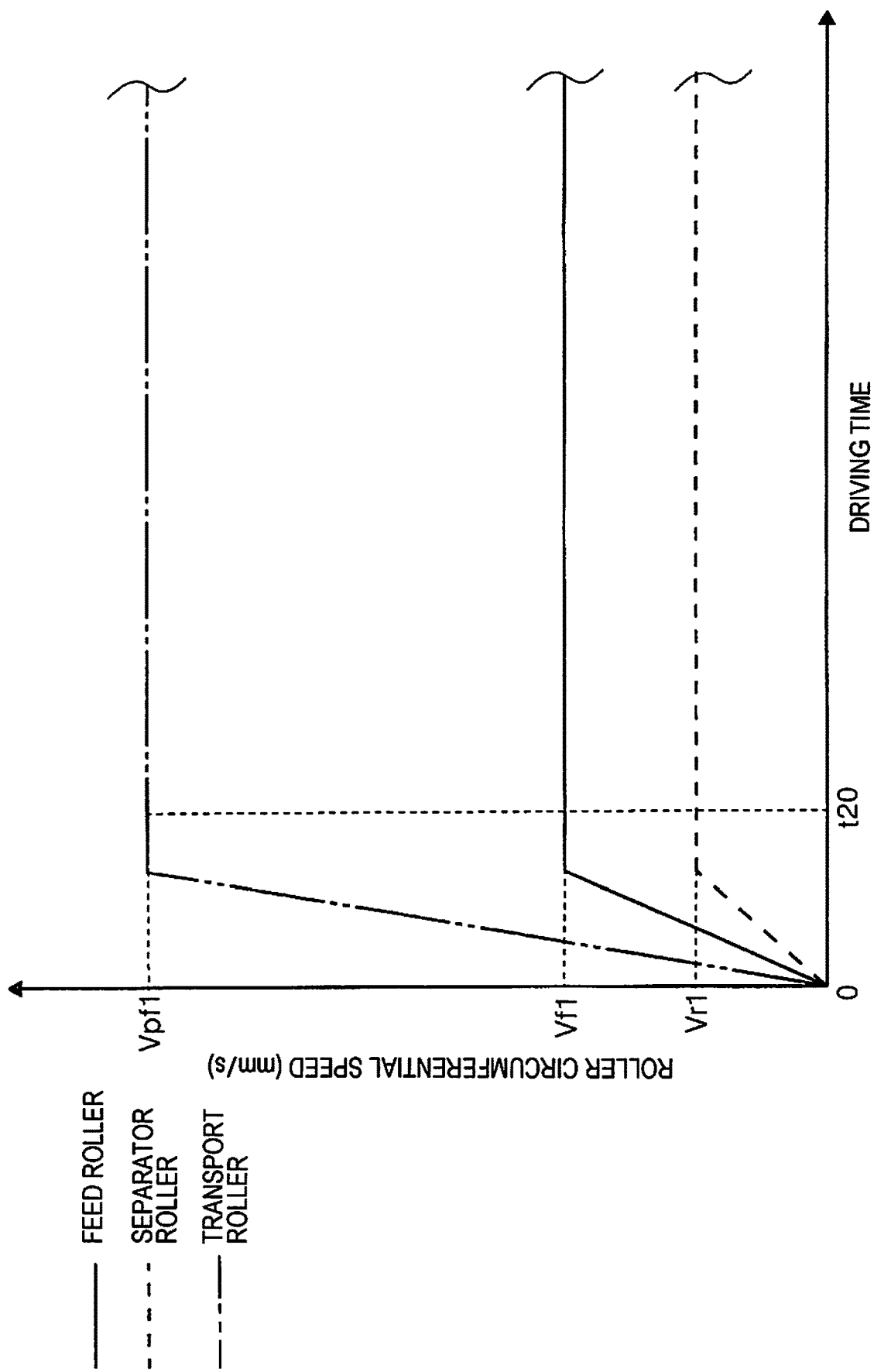
FIG. 19 is a graph illustrating speed control of various rollers in a low-resolution scan mode.
Figure 20:
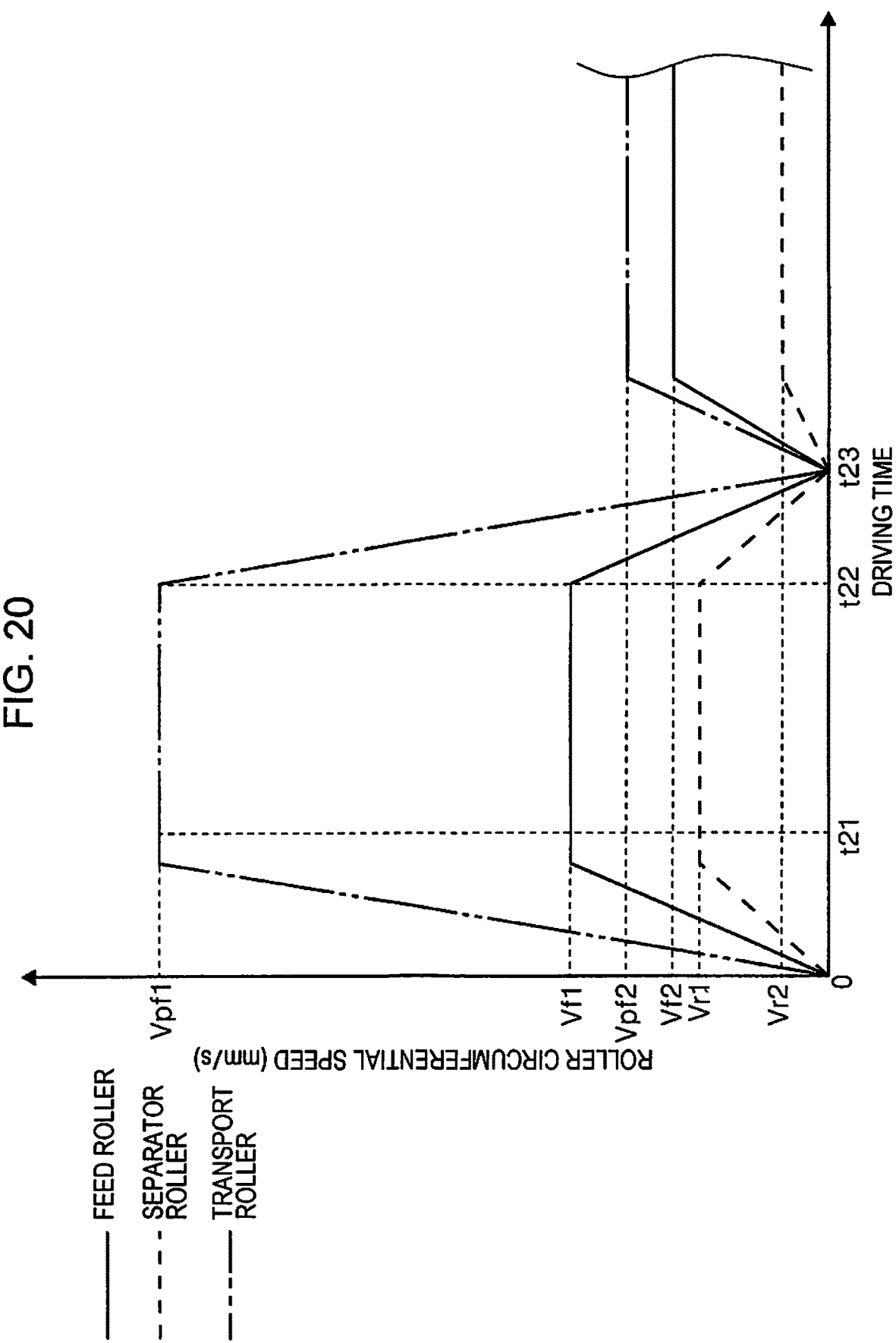
FIG. 20 is a graph illustrating speed control of the various rollers in a high-resolution scan mode.
Figure 21:
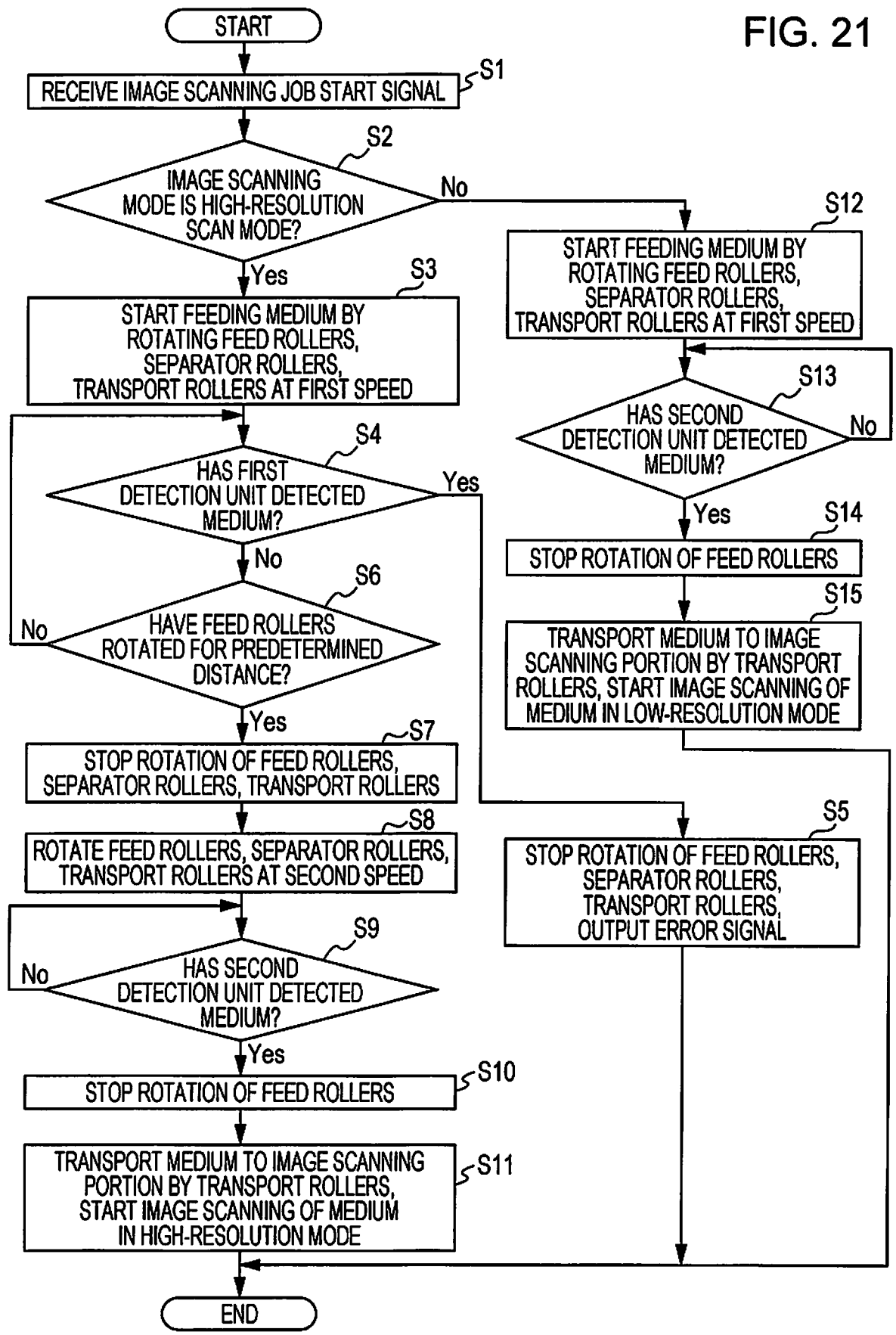
FIG. 21 is a flowchart concerning separation of media during the feeding of media according to the invention.
Figure 22:
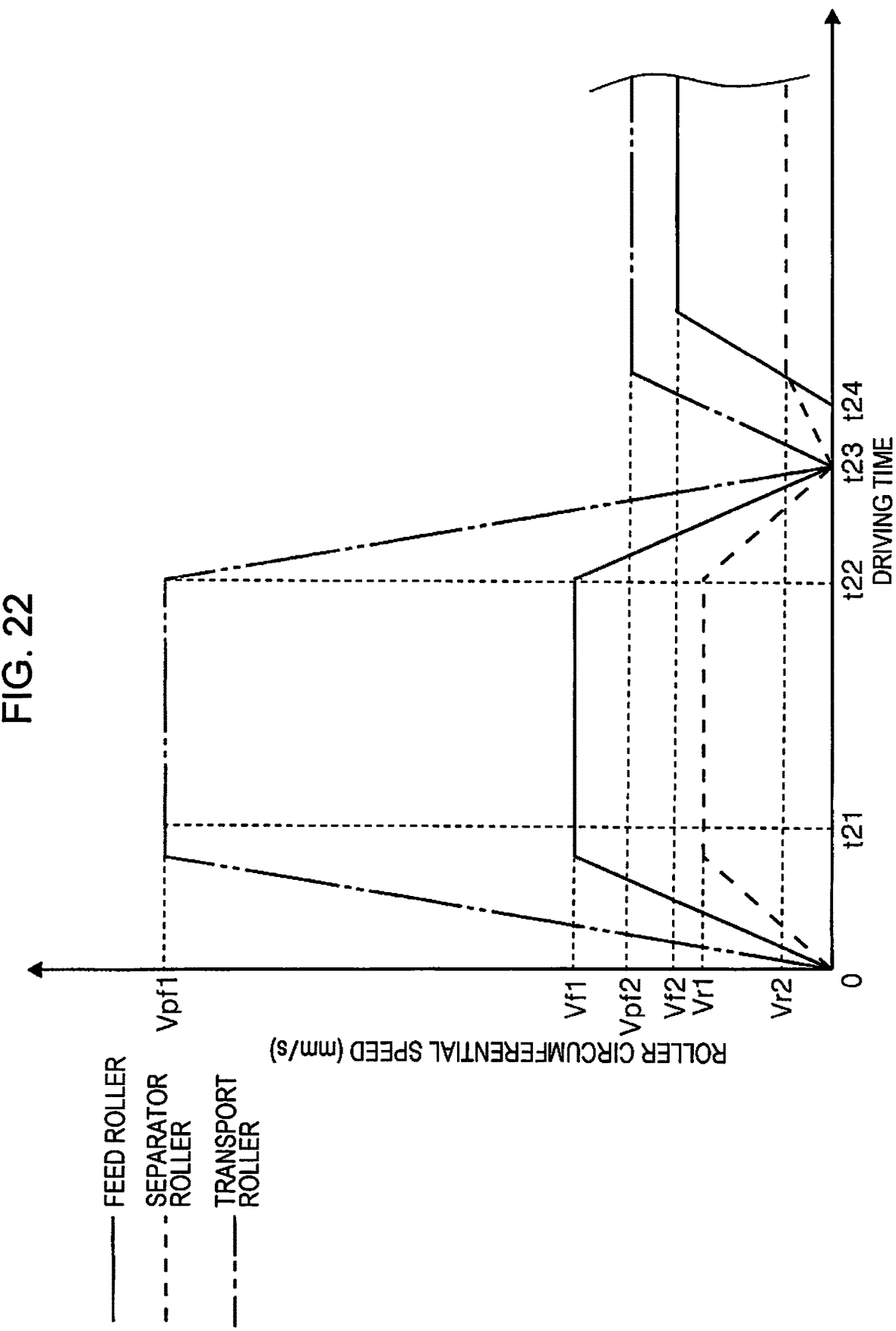
FIG. 22 is a graph illustrating a modification of the speed control of the various rollers in the high-resolution scan mode.

FIGS. 12 to 17 are schematic diagrams of the feeding path, illustrating transition of the feeding state in a second feed control in a stepwise manner. FIG. 18 is a timing chart of the second feed control. FIG. 19 is a graph illustrating speed control of various rollers in a low-resolution scan mode. FIG. 20 is a graph illustrating speed control of the various rollers in a high-resolution scan mode. FIG. 21 is a flowchart concerning separation of media during the feeding of media in the invention. FIG. 22 is a graph illustrating a modification of the speed control of the various rollers in the high-resolution scan mode.

Exemplary Embodiments of Image Scanning Apparatus

Referring to FIGS. 1 and 2, a scanner 10 provided as an exemplary embodiment of the image scanning apparatus of the invention includes a lower unit 12, an upper unit 14, a cover portion 16, and a discharge tray 18. In this exemplary embodiment, although not depicted in the drawings, the upper unit 14 is attached to the lower unit 12 pivotably about a sheet transport direction-downstream-side portion of the lower unit 12 (downstream-side portion of the lower unit 12 in a sheed transport direction) that serves as a pivot.

Furthermore, a rear-side upper portion of the lower unit 12 is provided with the cover portion 16 that is pivotably attached to the lower unit 12. The cover portion 16 is capable of assuming a non-feed state in which the cover portion 16 covers an upper portion of the upper unit 14 (not visible in FIG. 1) and a feed opening 20 and a feed-allowing state in which the cover portion 16 has been pivoted to a rear side of the scanner 10 (apparatus rear side) so as to open the feed opening 20 as illustrated in FIG. 2. When the cover portion 16 is in the feed-allowing state as illustrated in FIG. 1, a reverse surface of the cover portion 16 functions as a medium mount portion 16a on which a medium P is mounted.

Furthermore, at a front side of the lower unit 12 there is provided a discharge port 24 through which the medium P is sent out. The lower unit 12 is provided with the discharge tray 18 that is capable of being drawn out of the discharge port 24 to a front side of the scanner 10 (apparatus front side). The discharge tray 18 is capable of assuming a state (not depicted) of being retracted into a bottom portion of the lower unit 12 and a state (see FIG. 1) of being drawn out to the apparatus front side. In this exemplary embodiment, the discharge tray 18 is formed by coupling a plurality of tray members. The extracted length of the discharge tray 18 extracted from the discharge port 24 can be adjusted according to the length of the medium P that is sent out onto the discharge tray 18.

Sheet Transport Path of Scanner

Figure 3:
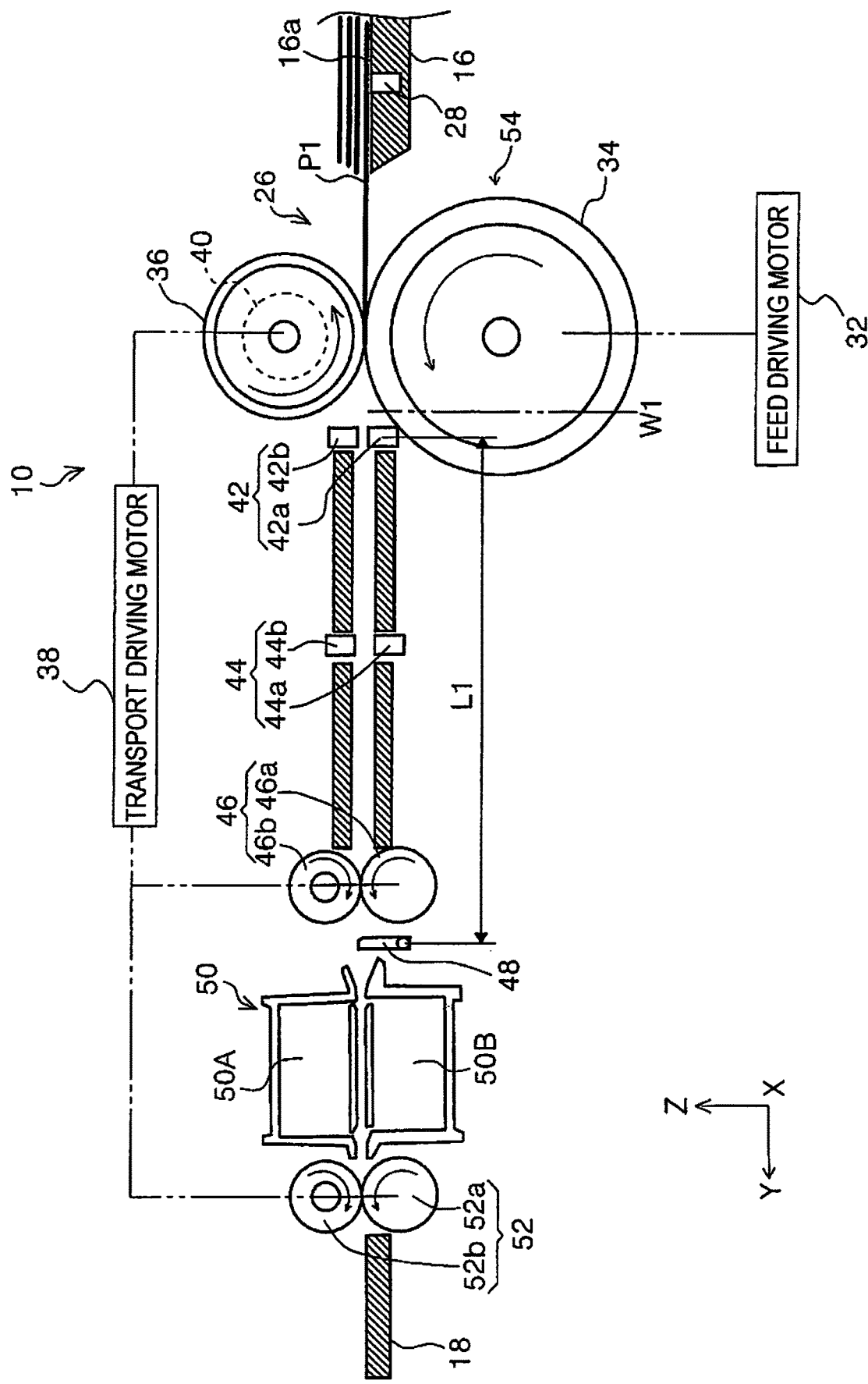
FIG. 3 is a schematic diagram of a feeding path, illustrating a feeding state in a first feed control.

With reference to FIGS. 2 and 3, a medium transport path 26 of the scanner 10 will be described. In FIG. 2, the lower unit 12 and the upper unit 14 are illustrated by imaginary lines representing only the contours of the casings of the two units. Furthermore, in FIG. 2, a thick solid line denoted by character P illustrates a guide path for a medium transported along the medium transport path 26 in the scanner 10.

In this exemplary embodiment, media P set at the feed opening 20 are mounted and supported on a reverse surface of the cover portion 16 being in a posture attained by pivoting to the apparatus rear side relative to the lower unit 12, that is, on a medium mount portion 16a. A plurality of media P can be set at the feed opening 20. Furthermore, the medium mount portion 16a is provided with a mount portion detection unit 28. The mount portion detection unit 28 is provided as, for example, a contact-type sensor that includes a lever or the like, or an optical sensor. When a medium P is set on the medium mount portion 16a, the mount portion detection unit 28 sends a detection signal to a control portion 30 (described below). As indicated above, the medium mount portion 16a allows a plurality of media P to be set thereon.

Of the media P mounted on the medium mount portion 16a, the lowermost medium P is fed to a downstream side in a feed direction (feed direction-downstream side) by feed rollers 34 (provided as a feeder unit) that are rotationally driven by a feed driving motor 32 (see FIG. 3). An outer peripheral surface of each feed roller 34 is formed from a high-friction material (e.g., an elastomer such as a rubber, or the like).

In FIG. 2, character G denotes a stack of media P mounted (set) on the medium mount portion 16a. As for the media stack G, prior to the feeding thereof, a front end (leading end) thereof is held at a feed standby position (position indicated in FIG. 2) by a stopper (not depicted) and therefore are restricted from entering gaps between the feed rollers 34 and separator rollers 36 (described later).

The separator rollers 36 are provided at such a location as to face the feed rollers 34. The separator rollers 36 are urged to the feed rollers 34 by an urger device (not depicted). The separator rollers 36 are rotationally driven in a direction (the counterclockwise direction in FIG. 3, so that the separator rollers 36 will move a medium back toward the medium mount portion 16a) that is the same as the rotation direction of the feed rollers 34 (the counterclockwise direction in FIG. 3, so that the feed rollers 34 will feed a medium to the downstream side) by a transport driving motor 38 (see FIG. 3). In this exemplary embodiment, an outer peripheral surface of each separator roller 36 is formed from a high-friction material (e.g., an elastomer such as a rubber, or the like) as is the case with the feed rollers 34.

Furthermore, in this exemplary embodiment, the separator rollers 36 are provided with a torque limiter 40. The separator rollers 36 are configured to receive drive torque from the transport driving motor 38 via the torque limiter 40.

Note that when the rotation torque received from the feed rollers 34 exceeds a limit torque of the torque limiter 40, the separator rollers 36 are disengaged from a drive system of the transport driving motor 38 by the torque limiter 40, so that the separator rollers 36 are rotated passively (in the clockwise direction in FIG. 3) by the feed rollers 34.

If, when the feeding of media P is started, a plurality of media P enter the gap between the feed rollers 34 and the separator rollers 36, the separator rollers 36 discontinue receiving a rotation torque from the feed rollers 34, so that the rotation of the separator rollers 36 passively driven by the feed rollers 34 stops. Then, the separator rollers 36 receive a drive force from the transport driving motor 38 via the torque limiter 40 and start to rotate in the same direction as the feed rollers 34 (i.e., rotate in the counterclockwise direction in FIG. 3, so that, at the roller gaps, the surface motion of the separator rollers 36 is in the opposite direction to the surface motion of the feed rollers 34). Thus, the upper one or more media P on (the one or more media P other than) the lowermost medium P that is to be fed (i.e., the one or more media P that need to be prevented from being multi-fed with the lower most medium P) do not receive transporting force for movement to the downstream side and are returned to an upstream side in the transport direction (transport direction-upstream side) by rotation of the separator rollers 36. In this manner, multi-feed of media P is prevented. Note that since the lowermost medium P that needs to be fed is in direct contact with the feed rollers 34, the lowermost medium P is moved to the downstream side by the transporting force acting from the feed rollers 34.

A first detection unit 42 that detects the feeding of a medium P is provided on the medium transport path 26 at the downstream side of the feed rollers 34 and the separator rollers 36. The first detection unit 42 is configured as, for example, an optical sensor. The first detection unit 42 includes a light emitting portion 42a and a light receiving portion 42b. Then, the light emitting portion 42a and the light receiving portion 42b are disposed at locations across the medium transport path 26 from each other. The first detection unit 42 is configured so that as a medium P is transported along the medium transport path 26 and blocks light from the light emitting portion 42a to the light receiving portion 42b, the first detection unit 42 detects the medium P. Upon detecting the medium P, the first detection unit 42 sends a detection signal to the control portion 30.

A multi-feed detection sensor 44 that detects multi-feed of media P is disposed on the medium transport path at the transport direction-downstream side of the first detection unit 42. In this exemplary embodiment, the multi-feed detection sensor 44 is configured as an ultrasonic wave sensor that includes a speaker portion 44a and a microphone portion 44b. The multi-feed detection sensor 44 is configured so that the speaker portion 44a produces ultrasonic waves to the medium P passing along the medium transport path 26 and the microphone portion 44b detects reflected sound from the medium P. In this exemplary embodiment, the multi-feed detection sensor 44 is capable of detecting the kind of sheets, such as a thick paper or the like, as well as multi-feed of media P by the frequency of reflected sound.

Transport roller pairs 46 are provided as a transporter on the medium transport path 26 at the transport direction-downstream side of the multi-feed detection sensor 44. Each transport roller pair 46 includes a driving transport roller 46a and a driven transport roller 46b that is passively driven by the driving transport roller 46a. In this exemplary embodiment, the driving transport rollers 46a are rotationally driven by the transport driving motor 38.

A second detection unit 48 is provided on the medium transport path 26 at the transport direction-downstream side of the transport roller pairs 46. The second detection unit 48 is configured as, for example, a contact-type sensor that includes a lever. When the medium P is transported along the medium transport path 26, a distal end of the medium P pushes the lever of the second detection unit 48 so that the lever pivots to the transport direction-downstream side (see FIG. 4). Thus, the second detection unit 48 detects the medium P. Upon detecting the medium P, the second detection unit 48 sends a detection signal to the control portion 30.

An image scanning portion 50 is provided as a scanning unit at the downstream side of the second detection unit 48. The image scanning portion 50 includes an upper scanning unit 50A provided in the upper unit 14 so as to face an upper surface of the medium P transported along the medium transport path 26 and a lower scanning unit 50B provided in the lower unit 12 so as to face a lower surface of the medium P transported along the medium transport path 26. In this exemplary embodiment, the upper scanning unit 50A and the lower scanning unit 50B are each configured as a scanning unit, for example, a close contact-type image sensor module (CISM).

After the image scanning portion 50 scans images on at least one of the obverse and reverse surfaces of the medium P, the medium P is nipped by sheet discharge roller pairs 52 disposed at the transport direction-downstream side of the image scanning portion 50 and is thereby sent out from the discharge port 24.

In this exemplary embodiment, each sheet discharge roller pair 52 includes a driving sheet discharge roller 52a and a driven sheet discharge roller 52b that is passively rotated by the driving sheet discharge roller 52a. In this exemplary embodiment, the driving sheet discharge rollers 52a are rotationally driven by the transport driving motor 38. Although the driving transport rollers 46a and the driving sheet discharge rollers 52a are rotationally driven by the transport driving motor 38 that is a common drive source, the driving transport rollers 46a and the driving sheet discharge rollers 52a may also be driven by separator drive sources.

Furthermore, a control portion 30 (see FIG. 2) is provided within the lower unit 12. In this exemplary embodiment, the control portion 30 is configured as an electric circuit that includes a plurality of electronic component parts. The control portion 30 receives detection signals from the mount portion detection unit 28, the first detection unit 42, the multi-feed detection sensor 44, and the second detection unit 48 and accordingly controls the upper scanning unit 50A and the lower scanning unit SOB and also the feed driving motor 32 and the transport driving motor 38 that rotationally drive the feed rollers 34, the driving transport rollers 46a, and the driving sheet discharge rollers 52a.

The control portion 30 is configured, for example, to control the transport of the medium P and an image scanning operation in the scanner 10. The control portion 30 may also control operations necessary for the execution of an medium scanning operation in the scanner 10 according to instructions from outside (e.g., from a personal computer (PC) or the like).

In this exemplary embodiment, the medium mount portion 16a, the feed rollers 34, the separator rollers 36, and the control portion 30 constitute a medium transport apparatus 54.

Feed Control (041 Feed control of media P in the scanner 10 will be described with reference to FIGS. 3 to 18. In this exemplary embodiment, when a length of a preceding medium in the feed direction is greater than a predetermined length, the control portion 30 (see FIG. 2) of the scanner 10 selects a first feed control for the feeding of the succeeding medium. When the length of the preceding medium in the feed direction is less than or equal to the predetermined length, the control portion 30 selects a second feed control for the feeding of the succeeding medium.

Although described in detail later, the first feed control is a control of performing a process in which the feed speed is temporarily increased in order to shorten the interval between a tailing end of a preceding medium and a leading end of the succeeding medium and the second feed control is a control of performing a process in which the aforementioned speed increasing process is not performed or the feed speed is increased to a level lower than in the first feed control.

The first feed control and the second feed control will be successively described below with reference to FIGS. 3 to 11 and FIGS. 12 to 18, respectively.

First Feed Control

The first feed control will be described with reference mainly to a timing chart shown in FIG. 11. The control portion 30 starts the rotational driving of the feed rollers 34 and the transport roller pairs 46 (see a first timing t1 in FIG. 11; hereinafter, see FIG. 11 for first to tenth timings t1 to t10). Then, as illustrated in FIG. 3, a preceding medium P1 as a "first medium" starts to be fed from the medium mount portion 16a. The medium P1 is then nipped between the feed rollers 34 and the separator rollers 36 and fed to the downstream side at a feed speed Va.

After moving past the separator rollers 36 to the downstream side along the medium transport path 26, the medium P1 is detected by the first detection unit 42 (see a second timing t2) The first detection unit 42 sends a detection signal regarding the medium P1 to the control portion 30. As the medium P1 is further moved to the feed direction-downstream side, the leading end of the medium P1 pushes the lever of the second detection unit 48, so that the lever is pivoted to the feed direction-downstream side. Thus, the second detection unit 48 detects the medium P1 (see a third timing t3). The second detection unit 48 sends a detection signal regarding the medium P1 to the control portion 30.

Figure 4:
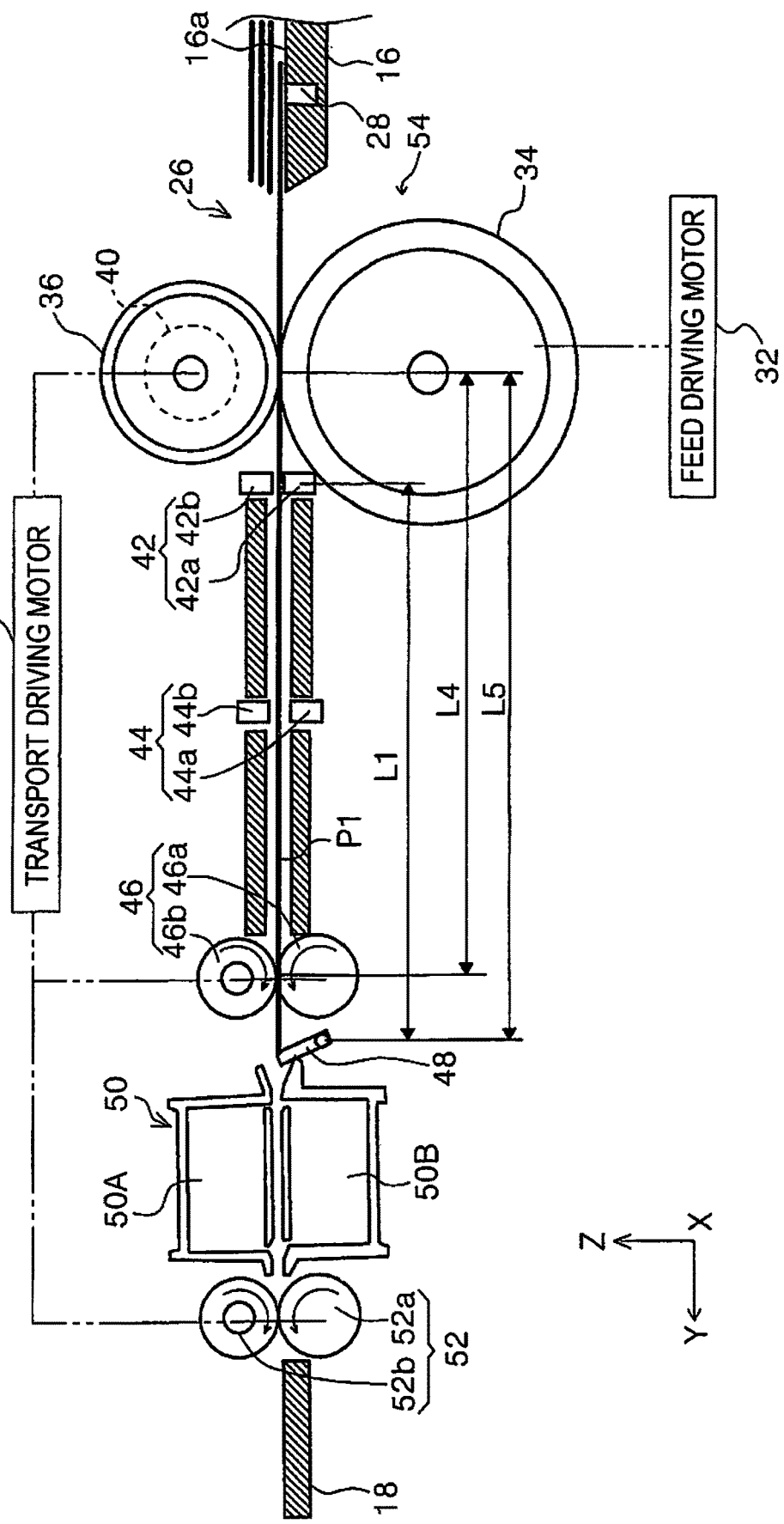
FIG. 4 is a schematic diagram of the feeding path, illustrating a feeding state in the first feed control.
Figure 5:
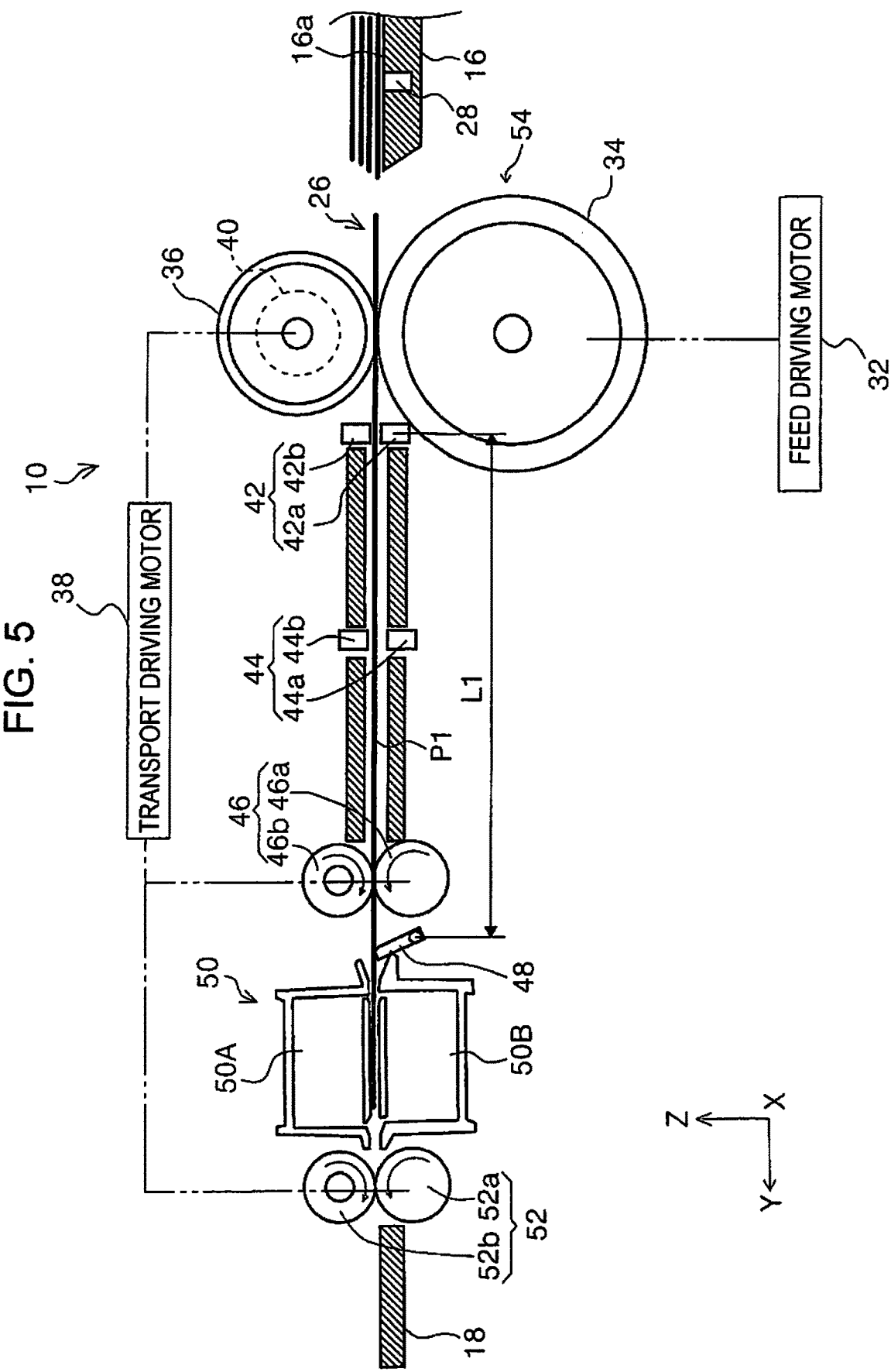
FIG. 5 is a schematic diagram of the feeding path, illustrating a feeding state in the first feed control.

The detection of the medium P1 by the second detection unit 48 means that the medium P1 has been nipped by the transport roller pairs 46 (see FIG. 4). Therefore, receiving the detection signal from the second detection unit 48, the control portion 30 stops the rotation of the feed rollers 34 (see the third timing t3). Then, the image scanning portion 50 starts scanning the medium P1 (i.e., scanning the image on the medium P1). At this time, since the feed rollers 34 stops, the medium P1 is transported to the image scanning portion 50 by the transport roller pairs 46 as illustrated in FIG. 5. Furthermore, since the feed rollers 34 stops, the feeding speed of the medium P1 equals to the transport speed Vc1 achieved by the transport roller pairs 46. In this exemplary embodiment, the transport speed Vc1 is pre-set to a speed greater than the feed speed Va.

Figure 6:
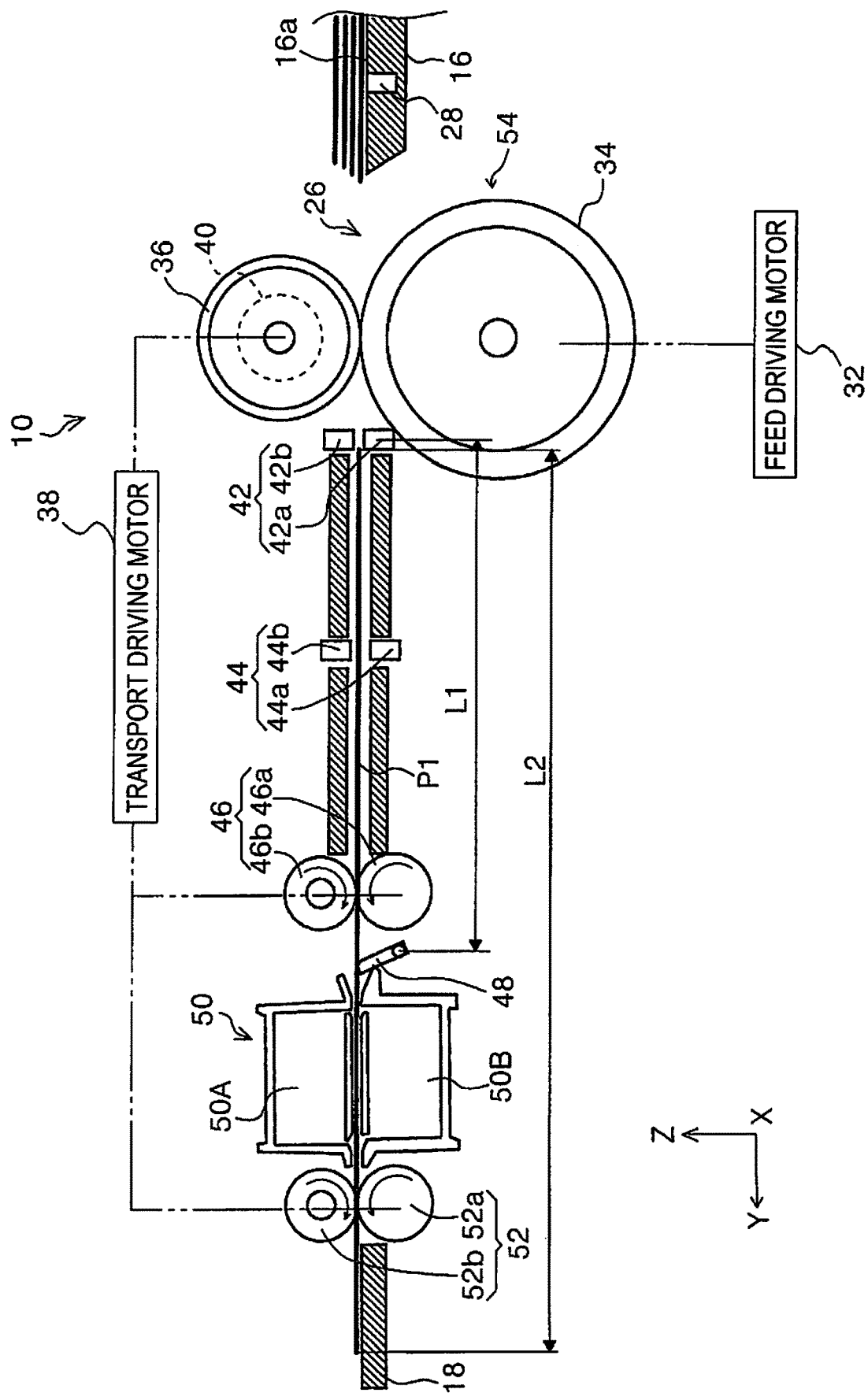
FIG. 6 is a schematic diagram of the feeding path, illustrating a feeding state in the first feed control.

Next, as illustrated in FIG. 6, when the tailing end of the medium P1 passes the first detection unit 42, the detection state of the first detection unit 42 switches, for example, from an on-state to an off-state (see a fourth timing t4). The control portion 30 determines that, on the medium transport path 26, the tailing end of the medium P1 has passed the first detection unit 42, and reduces the medium transport speed provided by the transport roller pairs 46 from the transport speed Vc1 to a transport speed Vc2.

At this time, the control portion 30 calculates a length L2 (see FIG. 6) of the medium P1 in the feed direction. Concretely, the length L2 of the medium P1 in the feed direction is a value obtained by adding a path length L1 from the first detection unit 42 to the second detection unit 48 along the medium transport path 26 to a value obtained by multiplying a time from the detection of the leading end of the medium P1 by the second detection unit 48 to the detection of the pass of the tailing end of the medium P1 by the first detection unit 42, that is, an elapsed time (t4−t3) from the third timing t3 to the fourth timing t4, by the transport speed Vc1 of the transport roller pairs 46. Specifically, the length L2 of the medium P1 in the feed direction is represent by L2=(t4−t3)×Vc1+L1.

Then, the control portion 30 determines whether the calculated length L2 of the medium P1 in the feed direction is greater than a pre-set length L. When the length L2 of the medium P1 in the feed direction is greater than the length L, the control portion 30 performs for the medium P2 that is subsequently fed the first feed control in which the feed speed during at least a predetermined period in a duration from when the leading end of the medium P2 passes the separator rollers 36 to when the second detection unit 48 detects the leading end of the medium P2 for feeding the medium P2 is changed from the speed Va to a speed Vb1 that is lower than, the speed Va. The pre-set length L is a length set according to the size of the short side of a card prescribed by International Standard Organization ISO/IEC 7810 "ID-1". The following description will be made on the assumption that the length L2 of the media P in the feed direction which follow the immediately succeeding medium P2 is greater than the length L.

Figure 7:
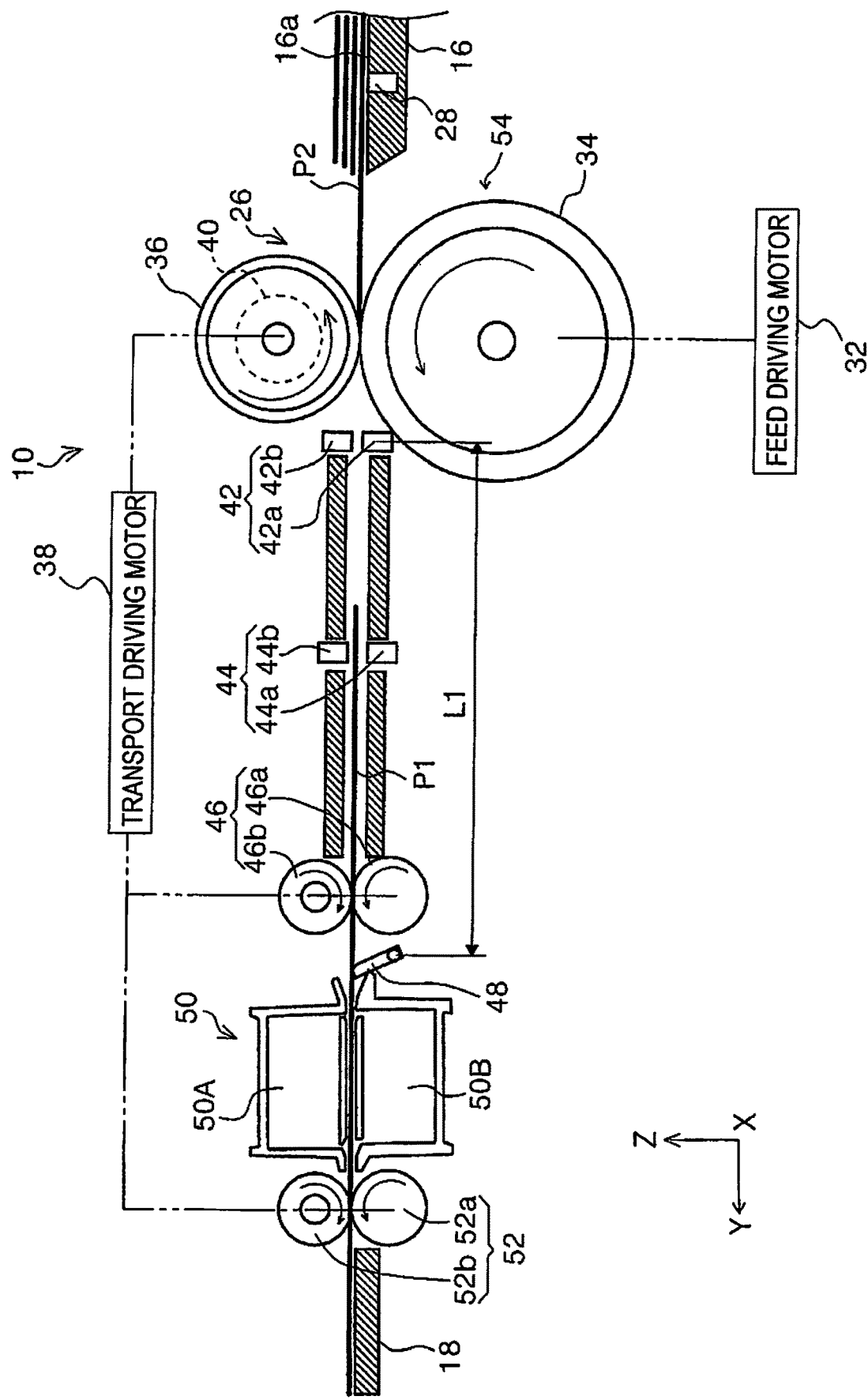
FIG. 7 is a schematic diagram of the feeding path, illustrating a feeding state in the first feed control.

More specifically, as illustrated in FIG. 7, the feed rollers 34 is rotated again to start feeding the succeeding medium P2 as a "second medium" from the medium mount portion 16a (see a fifth timing t5). Note that the feed starting time of the succeeding medium P2, that is, the fifth timing t5, is pre-set as a timing at which to start feeding the medium P2 following elapse of a predetermined first waiting time after the first detection unit 42 assumes the off-state. Incidentally, the control portion 30 performs the medium feeding at the feed speed Va by using the feed rollers 34 until a predetermined time elapses after the leading end of the succeeding medium P2 passes the first detection unit 42 after passing the separator rollers 36 (until an eighth timing t8).

That is, when the leading end of the succeeding medium P2 passes the first detection unit 42, the detection signal is sent to the control portion 30 (see a sixth timing t6). After that, the tailing end of the preceding medium P1 passes the second detection unit 48 (see a seventh timing t7).

Figure 8:
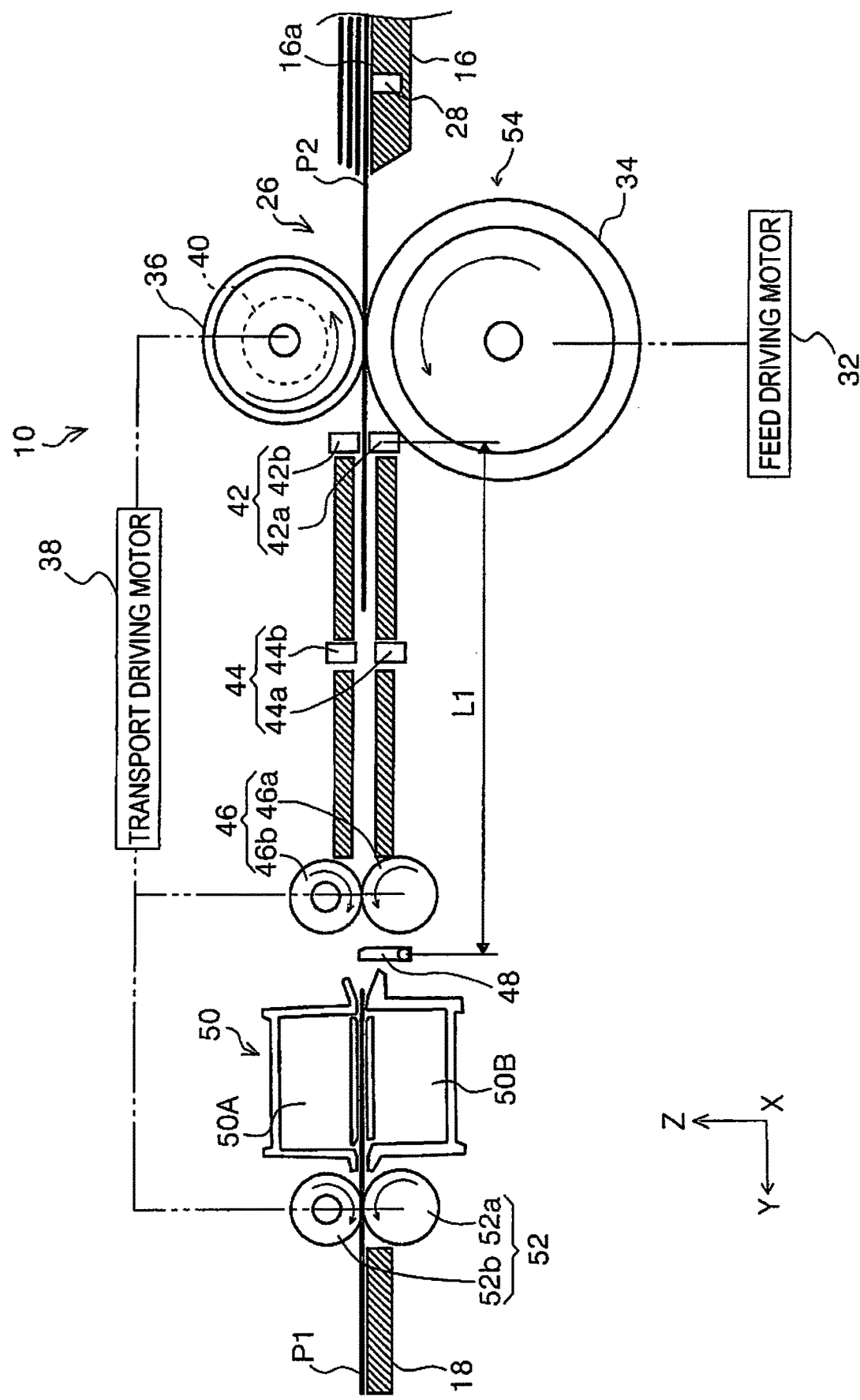
FIG. 8 is a schematic diagram of the feeding path, illustrating a feeding state in the first feed control.

Then, as illustrated in FIG. 8, after a predetermined time elapses following the detection of the tailing end of the preceding medium P1 by the second detection unit 48, the control portion 30 increases the speed of the feeding of the succeeding medium P2 by the feed rollers 34 from the speed Va to a speed Vb1 and also increases the speed of the transporting of the medium P by the transport roller pairs 46 from the speed Vc2 to a speed Vc1 (see the eighth timing t8). This shortens the interval between the tailing end of the preceding medium P1 and the leading end of the succeeding medium P2. Note that the eighth timing t8 is pre-set as a timing that follows the elapse of a predetermined second waiting time from the seventh timing t7.

Figure 9:
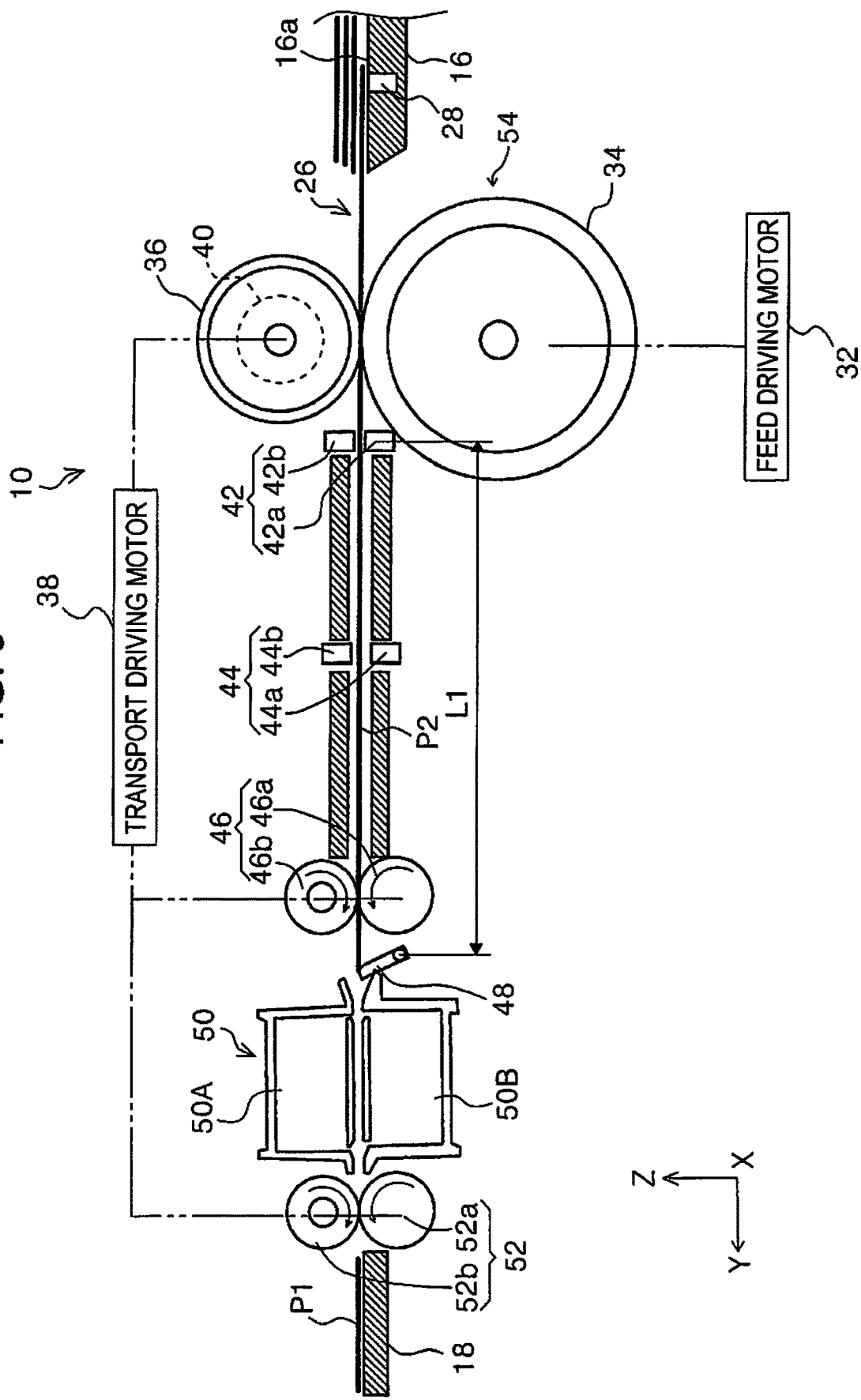
FIG. 9 is a schematic diagram of the feeding path, illustrating a feeding state in the first feed control.

Then, as illustrated in FIG. 9, when the second detection unit 48 detects the leading end of the medium P2, the control portion 30 stops rotation of the feed rollers 34 (see a ninth timing t9). Then, the image scanning portion 50 starts the image-scanning of the medium P2. During this time, since the feed rollers 34 are stopped, so that the medium P2 is transported to the image scanning portion 50 at the transport speed Vc1 by the transport roller pairs 46 as illustrated in FIG. 10. Then, after the first detection unit 42 detects the tailing end of the medium P2, the control portion 30 calculates the length L2 of the medium P2 in the feed direction and then determines whether the length L2 is longer than the pre-set length L (see a tenth timing t10).

Then, when the length L2 of a medium in the feed direction is greater than the pre-set length L, the control portion 30 performs the first feed control in substantially the same manner as described above. That is, the control portion 30 feeds the succeeding medium at the feed speed Va until the predetermined time elapses after the leading end of the medium passes the separator rollers 36. Then, after the tailing end of the preceding medium passes the second detection unit 48, the control portion 30 performs the control in which the feed speed is increased from the feed speed Va to the feed speed Vb1. The foregoing feeding is repeatedly performed until the mount portion detection unit 28 detects no medium P. Note that after the tenth timing t10 in FIG. 11, the operation performed from the fourth timing t4 to the tenth timing t10 is repeatedly performed until all the media P mounted on the medium mount portion 16a are fed out into the medium transport path 26.

Because the foregoing first feed control increases the feed speed of a succeeding medium from the speed Va to the speed Vb1 at the predetermined timing, the interval between the tailing end of a preceding medium and the leading end of the succeeding medium along the medium transport path 26 shortened, so that the throughput of the scanner 10 improves.

Second Feed Control

Next, the second feed control will be described with reference to FIG. 3 and FIGS. 12 to 18. As illustrated in FIG. 3, the control portion 30 starts the rotational driving of the feed rollers 34 and the transport roller pairs 46, so that a preceding medium P1 as a "first medium" starts to be fed from the medium mount portion 16a (see an eleventh timing t11 in FIG. 18; hereinafter see FIG. 18 for eleventh to the nineteenth timings t11 to t19).

Figure 12:
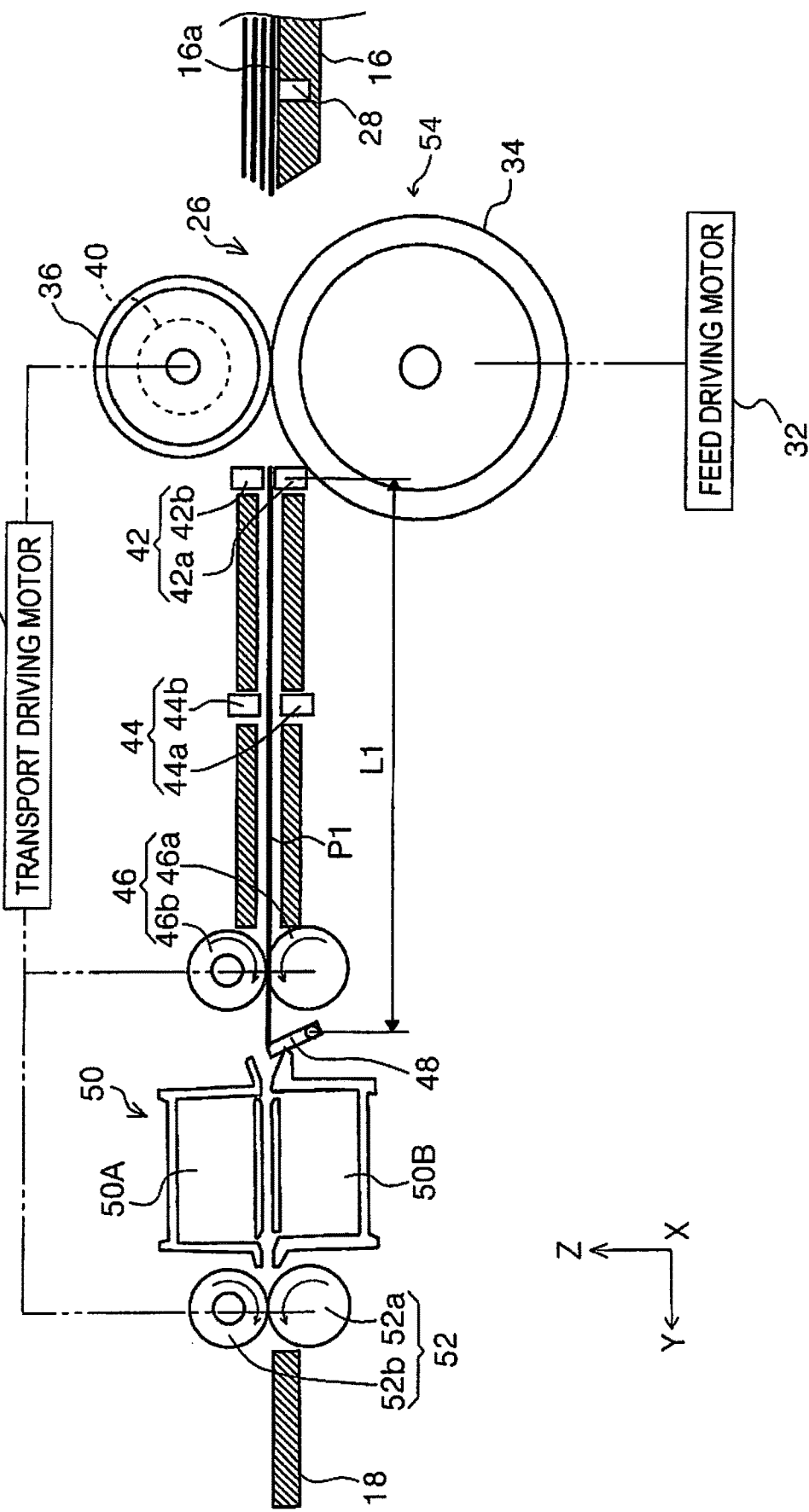
FIG. 12 is a schematic diagram of the feeding path, illustrating a feeding state in a second feed control.

The medium P1 is then nipped between the feed rollers 34 and the separator rollers 36 and fed to the downstream side at the feed speed Va. Then, the first detection unit 42 detects the medium P1 (see a twelfth timing t12). Then, as illustrated in FIG. 12, the second detection unit 48 detects the leading end of the medium P1 (see a thirteenth timing t13). Upon receiving the detection signal from the second detection unit 48, the control portion 30 stops rotating the feed rollers 34. Note that the medium P1 is fed at the feed speed Va during a period from the start of the feeding to the thirteenth timing t13.

Figure 13:
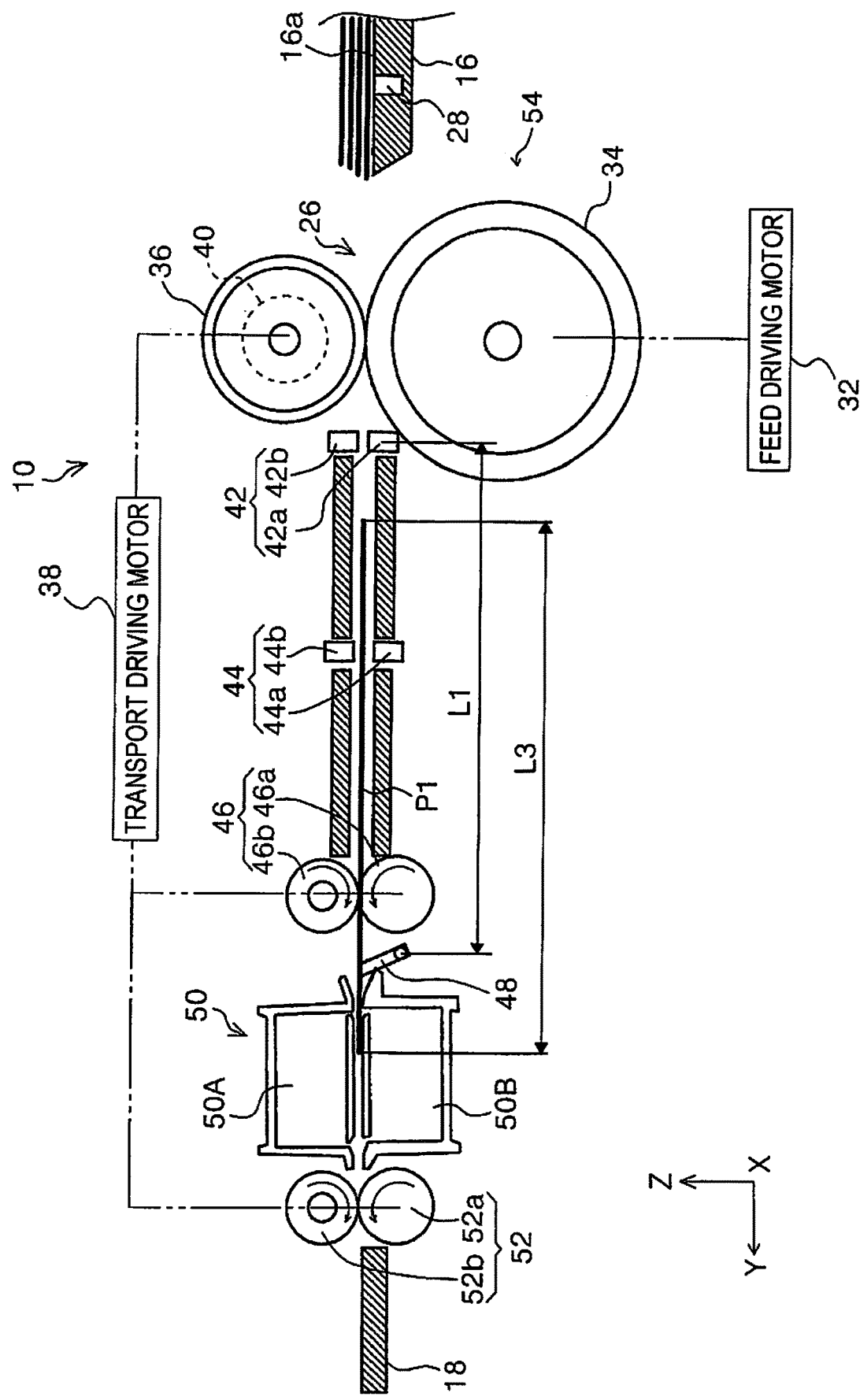
FIG. 13 is a schematic diagram of the feeding path, illustrating a feeding state in the second feed control.

Then, the image scanning portion 50 starts scanning the images on the medium P1. During this time, since the feed rollers 34 are stopped, the medium P1, nipped by the transport roller pairs 46, is sent to the image scanning portion 50 at the transport speed Vc1. Then, as illustrated in FIG. 13, the tailing end of the medium P1 passes the first detection unit 42 (see a fourteenth timing t14).

Then, the control portion 30 determines whether a calculated length L3 (see FIG. 13) of the medium P1 in the feed direction is greater than a pre-set length L. When the length L3 of the medium P1 in the feed direction is less than or equal to the length L, the control portion 30 performs the second control in which feeding is performed by maintaining the speed Va for a medium P2 that is subsequently fed (instead of increasing the feed speed to the speed Vb1 as in the first feed control illustrated in FIG. 11).

Note that the feed speed during at least a predetermined period in a duration from when the leading end of the subsequently fed medium P2 passes the separator rollers 36 to when the second detection unit 48 detects the medium P2 is set to a feed speed Vb2 that is, in this exemplary embodiment, set equal to the speed Va. However, it is a prerequisite that the speed Vb2 be at least lower than the speed Vb1 set in the first feed control illustrated in FIG. 11, and the speed Vb2 may be set higher than the speed Va as long as the set speed Vb2 does not hinder the feed control.

Figure 14:
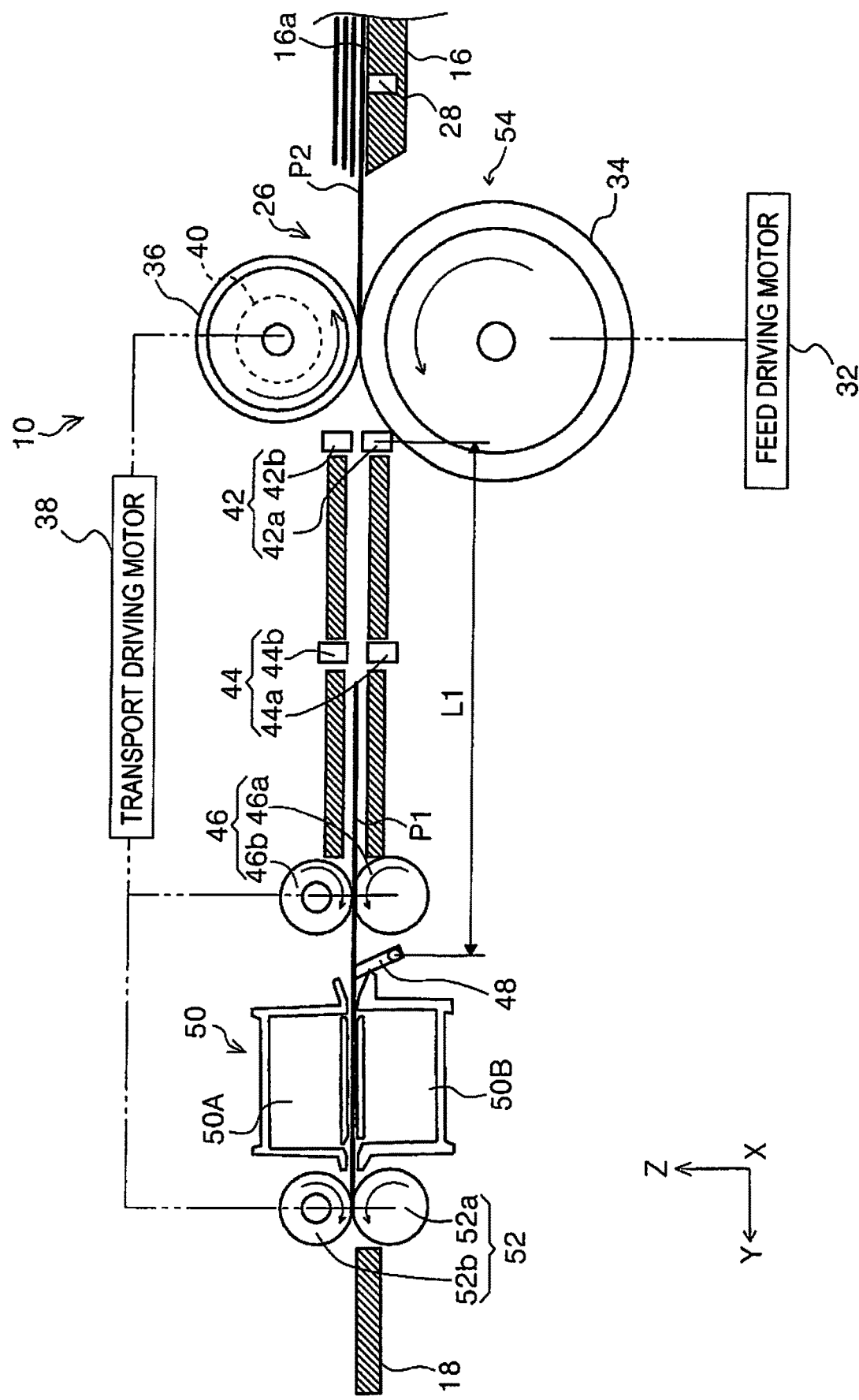
FIG. 14 is a schematic diagram of the feeding path, illustrating a feeding state in the second feed control.
Figure 15:
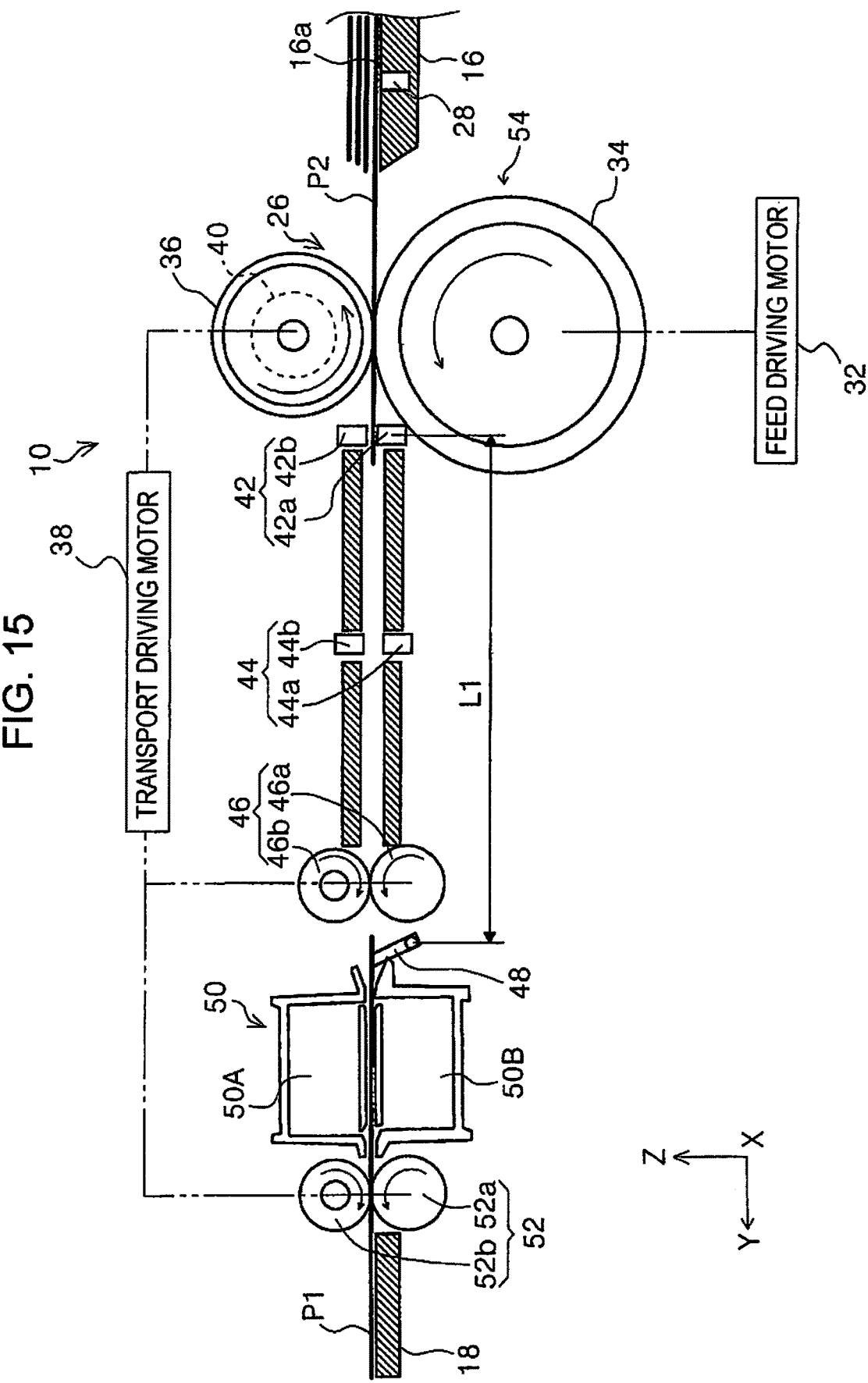
FIG. 15 is a schematic diagram of the feeding path, illustrating a feeding state in the second feed control.

When the tailing end of the medium P1 passes the first detection unit 42 as illustrated in FIG. 14, the control portion 30 reduces the transport speed of the transport roller pairs 46 from the speed Vc1 to the speed Vc2 and drives the feed rollers 34 again to start feeding the succeeding medium P2 (see the fourteenth timing t14). The medium P2 continues to be moved at the feed speed Va by the feed rollers 34 after the leading end of the medium P2 passes the separator rollers 36. Then, as illustrated in FIG. 15, the first detection unit 42 detects the leading end of the medium P2 (see a fifteenth timing t15).

Note that at the time point when the first detection unit 42 detects the leading end of the medium P2, the medium P1 remains detected by the second detection unit 48. However, since the transport speed Vc2 of the medium P1 is greater than the feed speed Va of the medium P2, the medium P2 does not catch up with the medium P1 but the interval between the media is kept appropriate.

Figure 16:
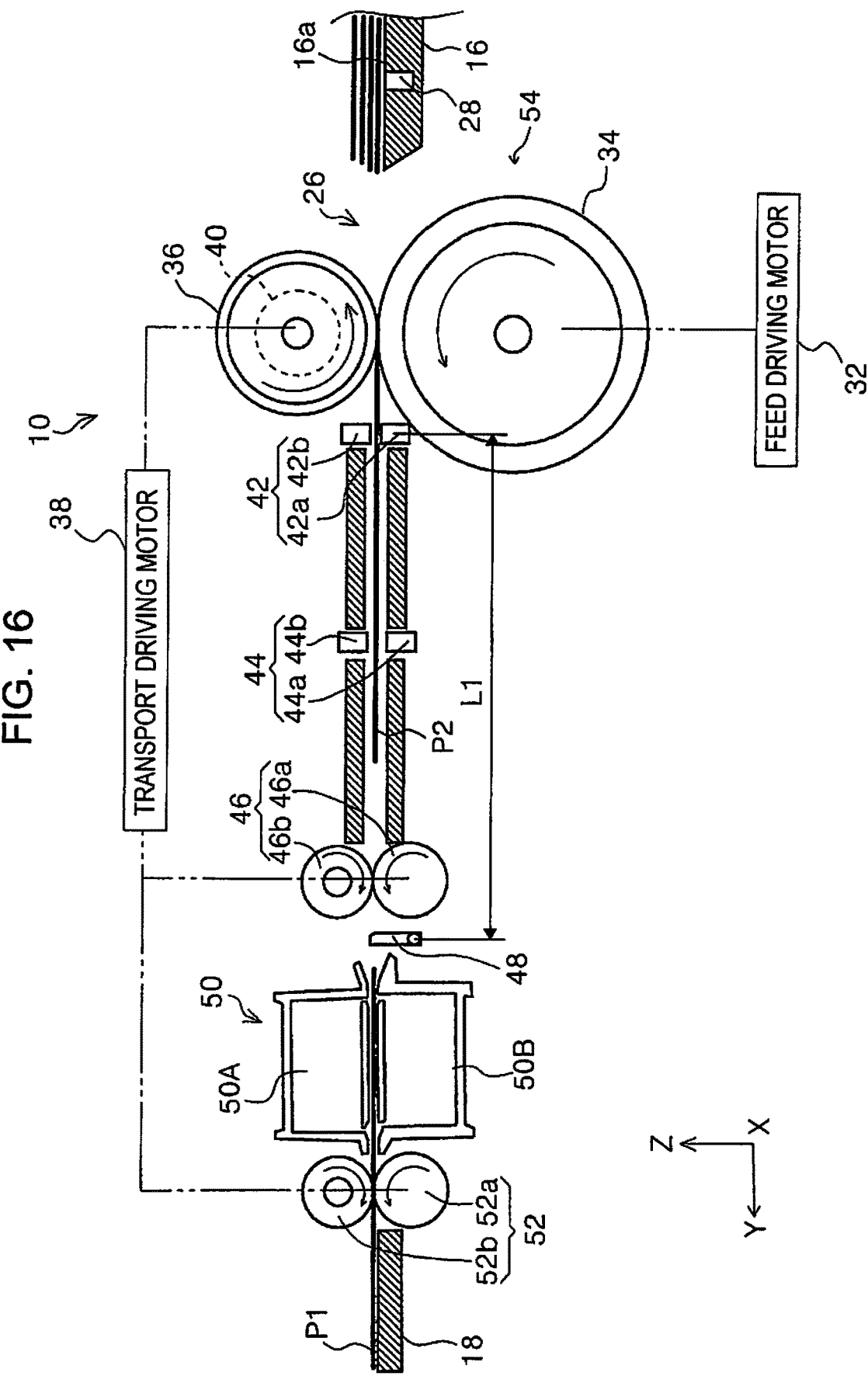
FIG. 16 is a schematic diagram of the feeding path, illustrating a feeding state in the second feed control.

Then, as illustrated in FIG. 16, as the medium P1 is moved to the downstream side at the transport speed Vc2 by the transport roller pairs 46, the tailing end of the medium P1 is detected by the second detection unit 48 (see a sixteenth timing t16). After that, the control portion 30 increases the transport speed Vc2 of the transport roller pairs 46 to the speed Vc1 (see a seventeenth timing t17) in response to the detection signal from the second detection unit 48. Then, when the leading end of the medium P2 reaches the second detection unit 48, the second detection unit 48 detects the leading end of the medium P2, causing the control portion 30 to stop rotating the feed rollers 34 (see an eighteenth timing t18). Then, the medium P2 is transported to the image scanning portion 50 at the transport speed Vc1 by the transport roller pairs 46 and is subjected to image scanning.

Figure 17:
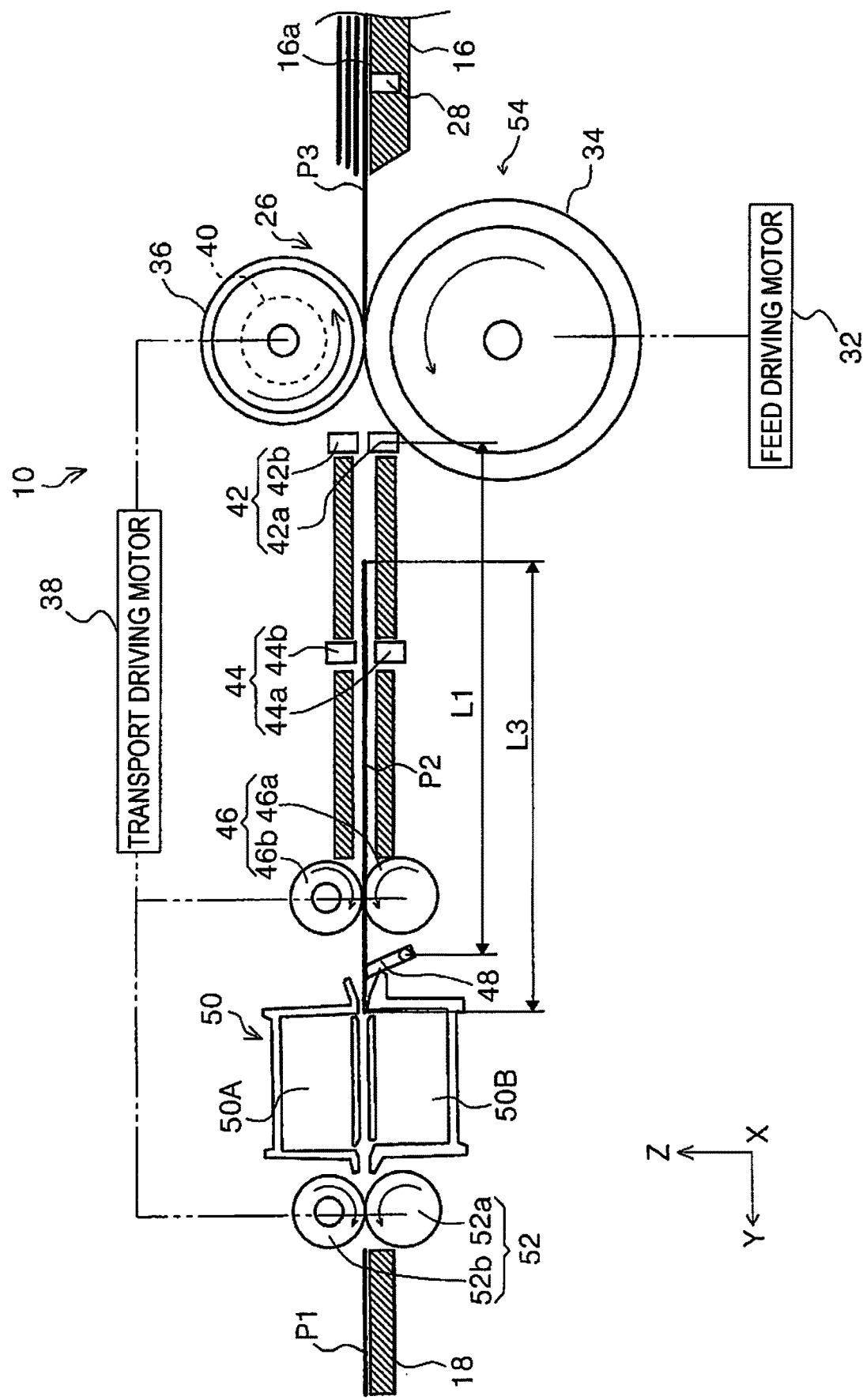
FIG. 17 is a schematic diagram of the feeding path, illustrating a feeding state in the second feed control.

Then, when the tailing end of the medium P2 passes the first detection unit 42 as illustrated in FIG. 17, the first detection unit 42 detects the tailing end of the medium P2 (see a nineteenth timing t19). Then, the control portion 30 calculates the length L3 of the medium P2 in the feed direction and determines whether the length L3 is less than or equal to the pre-set length L. When the length L3 of the medium P2 in the feed direction is less than or equal to the length L, the control portion 30 determines that the feed control of the succeeding medium P3 is to be the second feed control. Furthermore, as illustrated in FIG. 17, the control portion 30 drives the feed rollers 34 again to start feeding the succeeding medium P3 and reduces the transport speed of the transport roller pairs 46 from the speed Vc1 to the speed Vc2 (see a nineteenth timing t19).

In the feeding of the succeeding medium P3, since the control portion 30 has selected the second feed control, the medium P3 continues to be fed at the feed speed Va (=Vb2) even after the leading end of the medium P passes the separator rollers 36. The foregoing feeding is repeatedly performed until the mount portion detection unit 28 detects no medium P. Note that after the nineteenth timing t19 in FIG. 18, the operation performed from the fourteenth timing t14 to the nineteenth timing t19 is repeatedly performed until all the media mounted on the medium mount portion 16a are sent out into the medium transport path 26.

The second feed control can be summarized as follows. The second feed control is a speed control mode that is entered when the length L3 (L2) of a preceding medium P1 in the feed direction is less than or equal to than the pre-set length L. In the second feed control, even after the succeeding medium P2 passes the separator rollers 36, the succeeding medium P2 continues to be fed at the feed speed Vb2, which is lower than the feed speed Vb1 set in the first feed control illustrated in FIG. 11.

Although in this exemplary embodiment, the pre-set length L is a length according to the size of the short side of a card prescribed in International Standard Organization ISO/IEC 7810 ID-1, the pre-set length L is not limited so. For example, the pre-set length L may be a length that is greater than a path length L4 (see FIG. 4) from a nip point of the feed rollers 34 and the separator rollers 36 to a nip point of the transport roller pairs 46 and less than or equal to a path length L5 (see FIG. 4) from the nip point of the feed rollers 34 and the separator rollers 36 to the second detection unit 48.

That is, when the length of a preceding medium P1 in the feed direction is less than or equal to the path length L5 in FIG. 4, the second detection unit 48 detects the leading end of the preceding medium P1 after the tailing end of the preceding medium P1 has passed the nip point of the feed rollers 34 and the separator rollers 36. When the tailing end of the preceding medium P1 has passed the nip point of the feed rollers 34 and the separator rollers 36, the leading end of the succeeding medium P2 is at the nip point of the feed rollers 34 and the separator rollers 36 or has moved to the downstream side of the nip point. This means that the feeding of the succeeding medium P2 starts unintentionally. After that, when the second detection unit 48 detects the leading end of the preceding medium P1, the control portion 30 stops the feed control (stops feeding). However, because, prior to the stop of the feed control by the control portion 30, the succeeding medium P2 is moved at the feed speed Vb2, the interval between the preceding medium P1 and the succeeding medium P2 from becoming unintentionally short, so that the possibility of causing a scanning failure cannnot be inhibited (which will be described in detail below).

Operation and Effects of Selective Use of First Feed Control and Second Feed Control As described above, when the length of a preceding medium in the feed direction is greater than the predetermined length, the control portion 30 selects the first feed control for the feeding of the succeeding medium. When the length of a preceding medium in the feed direction is less than or equal to the predetermined length, the control portion 30 selects the second feed control for the feeding of the succeeding medium. The second feed control is, as described above, a control in which the process of temporarily increasing the feed speed in order to shorten the interval between the tailing end of a preceding medium and the leading end of the succeeding medium is not performed. The operation and effects achieved by this control are as follows.

Basically, the feeding operation for a medium (the driving of the feed rollers 34) is stopped when the leading end of the medium is detected by the second detection unit 48. However, a certain amount of time (braking distance) is required between when the control portion 30 stops driving the feed rollers 34 and when the rotation of the feed rollers 34 actually comes to a full stop.

In the case of a relatively long medium, when the control portion 30 stops driving the feed rollers 34, the tailing end of the medium is on the upstream side of the separator rollers 36, so that, despite the time lag before the feed rollers 34 stop rotating, the succeeding medium is not fed out. However, in the case of a relatively short medium, at the time point when the leading end thereof is detected by the second detection unit 48, the tailing end thereof has moved to the downstream side of the separator rollers 36. Therefore, if, during this state, the full stop of the feed rollers 34 significantly lags behind, the succeeding medium is unintentionally fed out and, in some cases, may move to the downstream side of the separator rollers 36, so that the interval between the tailing end of the preceding medium and the leading end of the succeeding medium may unintentionally shorten and therefore scanning failure may result.

This problem is likely to occur particularly when the feed speed is temporarily increased as is the case with the feed speed Vb1 in FIG. 11 (first feed control). This is because the faster the feed rollers 34 are rotated, the longer time it takes for the feed rollers 34 to fully stop.

Therefore, in this exemplary embodiment, when it is determined that the length of a preceding medium is less than or equal to a predetermined length as described above, the process of temporarily increasing the feed speed for the succeeding medium is avoided (second feed control), so that it is possible to avoid the problem that the interval between the tailing end of a medium and the leading end of the succeeding medium unintentionally shortens and therefore scanning failure results.

Note that when a plurality of media are fed, the process of temporarily increasing the feed speed is not performed for the sake of the first medium to be fed, regardless of the length of the medium, as illustrated in FIGS. 11 and 18. This is because detection of the length of a preceding medium in the feed direction is not available for the sake of the first medium to be fed.

Modifications of Feed Control

In this exemplary embodiment, the control portion 30 performs the control in which the length L2 of a transported medium P in the feed direction is compared with the pre-set length L, the first feed control is performed when the length L2 is greater than the length L, and the second feed control is performed when the length L2 is less than or equal to the length L. However, this control may be replaced by a control in which the first feed control and the second feed control are selectively performed according to a characteristic of a medium P, for example, the thickness of a medium P. Concretely, the control portion 30 performs a control in which the first feed control is performed when the thickness of a medium P under transportation is greater than a pre-set thickness t and the second feed control is performed when the thickness of a medium P under transportation is less than or equal to the pre-set thickness t.

That is, when a medium has small thickness and low rigidity, increased feed speed may possibly increase the damage caused on the medium if the medium catches on small protrusions or recesses along the medium transport path, and may possibly cause the medium to jam during the subsequent transport process. However, switching the feed control according to the thicknesses of media as described above can be expected to avoid the foregoing problem.

Feed Control According to Resolution

A feed control according to different resolutions for scanning images on media P will be described with reference to FIGS. 19 to 22. In this exemplary embodiment, the image scanning portion 50 of the scanner 10 is configured to be capable of scanning media P at at least two different resolutions. Concretely, the image scanning portion 50 has a low-resolution scan mode and a high-resolution scan mode. For example, the low-resolution scan mode is set to scan a medium P at 300 dpi and the high-resolution scan mode is set to scan a medium P at 600 dpi.

Low-Resolution Scan Mode

First, the low-resolution scan mode will be described with reference to FIG. 19. The control portion 30 first starts to rotationally drive the feed rollers 34, the separator rollers 36, and the transport roller pairs 46. The roller circumferential speed of the feed rollers 34 is Vf1, the roller circumferential speed of the separator rollers 36 is Vr1, and the roller circumferential speed of the transport roller pairs 46 (driving transport rollers 46a) is Vpf1. These roller circumferential speeds are set so as to have a relation Vpf1>Vf1>Vr1.

When the roller circumferential speed Vf1 of the feed rollers 34 is greater than the roller circumferential speed Vpf1 of the driving transport rollers 46a, a medium P may possibly be stuck (jammed) and flawed in the medium transport path 26. Therefore, the roller circumferential speed Vf1 of the feed rollers 34 is set lower than the roller circumferential speed Vpf1 of the driving transport rollers 46a.

In this exemplary embodiment, setting is made such that a medium P fed from the medium mount portion 16a reaches the separator rollers 36 after a time t20 elapses following the start of the rotational driving of the various rollers. In this exemplary embodiment, the separator rollers 36 reach the roller circumferential speed Vr1 before the time t20 elapses, so that the separator rollers 36 can fully achieve the medium P-separating performance and inhibit multi-feed.

As illustrated in FIG. 4 as an example, when the leading end of a medium P (a medium P1 in FIG. 4) sent to the downstream side by the feed rollers 34 is detected by the second detection unit 48, the control portion 30 stops rotating the feed rollers 34. Note that, when the second detection unit 48 is detected a medium P, the medium P has been nipped by the transport roller pairs 46, so that the control portion 30 sends the medium P to the image scanning portion 50 by using the transport roller pairs 46 and starts the image scanning of the medium P. Note that, at this time, the roller circumferential speed of the driving transport rollers 46a is Vpf1.

The low-resolution scan mode, compared with the high-resolution scan mode described below, allows higher transport speed and higher scan speed for the medium P so as to improve throughput, at the expense of lower image quality.

High-Resolution Scan Mode

Next, the high-resolution scan mode will be described with reference to FIG. 20. The control portion 30 first starts to rotationally drive the feed rollers 34, the separator rollers 36, and the transport roller pairs 46. Then, the rollers are, for example, accelerated to speeds that are substantially equal to those in the low-resolution scan mode. That is, the feed rollers 34 are accelerated to the roller circumferential speed Vf1, the separator rollers 36 are accelerated to the roller circumferential speed Vr1, and the transport roller pairs 46 (driving transport rollers 46a) are accelerated to the roller circumferential speed Vpf1.

Then, the medium P fed from the medium mount portion 16a reaches the separator rollers 36 after a time t21 elapses following the start of the rotation driving of the various rollers. Because the separator rollers 36 reach the roller circumferential speed Vr1 before the time t21 elapses, the separator rollers 36 can fully achieve the medium P-separating performance and therefore can inhibit multi-feed.

Then, the control portion 30, after a medium P starts to be fed, stops rotationally driving the feed rollers 34, the separator rollers 36, and the transport roller pairs 46 at a time t22 so that the leading end of the medium P reaches a location W1 (see FIG. 3) on the medium transport path 26. Note that the amount of rotation of the feed rollers 34 needed in order to position the leading end of the medium P at the location W1 in FIG. 3 can be determined beforehand. In this exemplary embodiment, the location W1 is set at a location at which the leading end of the medium P can be stopped and which is before a location at which the leading end of the medium P can be detected by the first detection unit 42.

Then, as described below, if the first detection unit 42 does not detect a medium P, the control portion 30 re-drives the rollers at a time t23. Then, the control portion 30 accelerates the feed rollers 34 to a roller circumferential speed Vf2, accelerates the separator rollers 36 to a roller circumferential speed Vr2, and accelerates the transport roller pairs 46 (driving transport rollers 46a) to a roller circumferential speed Vpf2.

Then, as illustrated in FIG. 4 as an example, when the leading end of the medium P (medium P1 in FIG. 4) fed to the downstream side by the feed rollers 34 is detected by the second detection unit 48, the control portion 30 stops rotating the feed rollers 34. Note that, when the second detection unit 48 detects the medium P, the medium P has been nipped by the transport roller pairs 46, so that the control portion 30 feeds the medium P1 to the image scanning portion 50 by using the transport roller pairs 46 and starts the image scanning of the medium P. At this time, the roller circumferential speed of the driving transport rollers 46a is Vpf2.

Note that the foregoing circumferential speeds of the rollers have a relation Vpf1>Vf1>Vpf2>Vf2>Vr1>Vr2. That is, the circumferential speeds of the various rollers reached by re-driving the rollers at the time t23 are set lower than the circumferential speeds of the rollers reached before the time t22 (corresponding to the circumferential speeds of the rollers in the low-resolution scan mode). Therefore, in the image scanning portion 50, the medium P can be fed at a feeding speed lower than the feeding speed in the low-resolution scan mode, so that the image can be scanned at a higher resolution.

Furthermore, when a medium P comes into contact with the feed rollers 34 rotating at low circumferential speed, the non-feeding of the medium P may sometimes occur because the transporting force acting from the feed rollers 34 is small. However, in the high-resolution scan mode in this exemplary embodiment, the feed rollers 34 are first rotated at high speed to provide a transporting force necessary to transport a medium P before the medium P comes into contact with the feed rollers 34, so that the non-feeding of the medium P can be inhibited. Furthermore, the separator rollers 36 reach the roller circumferential speed Vr1 before the elapse of the time t23 so that the separator rollers 36 can fully achieve the medium P-separating performance and therefore inhibit multi-feed.

Next, flow of the feed control according to resolution will be described with reference to FIG. 21. In step S1, the control portion 30 receives a start signal for an image scanning job. Then, in step S2, the control portion 30 determines whether the image scanning mode is currently the high-resolution scan mode. When the image scanning mode is the high-resolution scan mode, the control portion 30 goes to step S3. When the image scanning mode is not the high-resolution scan mode but the low-resolution scan mode, the control portion 30 goes to step S12.

In step S3, the control portion 30 rotationally drives the feed rollers 34, the separator rollers 36, the transport roller pairs 46 (driving transport rollers 46a) at first speeds Vf1, Vr1, and Vpf1 to start feeding a medium P. Next, the control portion 30 performs a process (step S6) of rotating the feed rollers 34 for a predetermined distance in order to stop the leading end of the medium P at the location W1 indicated in FIG. 3 while monitoring whether, during the rotation, the leading end of the medium P is detected by the first detection unit 42 (step S4).

If the first detection unit 42 detects the medium P before the feed rollers 34 has rotated for the predetermined distance to stop the leading end of the medium P at the location W1 in FIG. 3, that is, if the leading end of the medium P advances downstream farther than is intended, there is possibility that the medium P may not have been appropriately set. Furthermore, there is possibility that the leading end of the medium P, while still moving at high feeding speed, may come into contact with the transport roller pairs 46 and, in such a case, the medium P may be jammed or flawed. Therefore, when the first detection unit 42 detects the medium P, the control portion 30 in step S5 stops rotating the feed rollers 34, the separator rollers 36, and the transport roller pairs 46 (driving transport rollers 46a) and outputs an error signal. As a result, the risk of causing the medium P to be jammed or flawed can be reduced. After outputting the error signal, the control portion 30 ends the image scanning job.

When the feed rollers 34 have rotated for the predetermined distance (step S6 in Yes), the control portion 30 goes to step S7. In step S7, the control portion 30 stops rotating the feed rollers 34, the separator rollers 36, and the transport roller pairs 46 (driving transport rollers 46a). Then, in step S8, the control portion 30 rotationally drives the feed rollers 34, the separator rollers 36, the transport roller pairs 46 (driving transport rollers 46a) at second speeds Vf2, Vr2, and Vpf2.

Then, in step S9, the control portion 30 determines whether the second detection unit 48 has detected the leading end of the medium P. When the second detection unit 48 has not detected the leading end of the medium P, the control portion 30 keeps executing step S9. After the second detection unit 48 detects the leading end of the medium P, the control portion 30 stops rotating the feed rollers 34 in step S10. Then, in step S11, the control portion 30 transports the medium P to the image scanning portion 50 by using the transport roller pairs 46 and starts the image scanning of the medium P in the high-resolution scan mode. After the image scanning of the medium P ends, the control portion 30 stops the transport roller pairs 46 and ends the image scanning job.

When in step S2 it is determined that the image scanning mode is not the high-resolution scan mode, the process proceeds to step S12. Then, in step S12, the control portion 30 rotationally drives the feed rollers 34, the separator rollers 36, and the transport roller pairs 46 (driving transport rollers 46a) at the first speeds Vf1, Vr1, and Vpf1 to start feeding a medium P.

In step S13, the control portion 30 determines whether the second detection unit 48 has detected the leading end of the medium P. When the second detection unit 48 has not detected the leading end of the medium P, the control portion 30 keeps executing step S13. After the second detection unit 48 detects the leading end of the medium P, the control portion 30 stops rotating the feed rollers 34 in step S14. Then, in step S15, the control portion 30 transports the medium P to the image scanning portion 50 by using the transport roller pairs 46 and starts the image scanning of the medium P in the low-resolution scan mode. After the image scanning of the medium P ends, the control portion 30 stops the transport roller pairs 46 and ends the image scanning job.

Modifications of Feed Control According to Resolution (1) In the foregoing exemplary embodiment, control is performed such that the feed rollers 34, the separator rollers 36, and the transport roller pairs 46 (driving transport rollers 46a) are driven at the second speeds at the same timing (simultaneously) at the time t23 as illustrated in FIG. 20. However, instead of this control, the timing of re-driving the feed rollers 34 may be shifted to a time t24 that is after the time t23 as illustrated in in FIG. 22. This substantially avoids an event that, due to variation or the like in control, the circumferential speed of the feed rollers 34 becomes higher than the circumferential speed of the transport roller pairs 46 (driving transport rollers 46a).

(2) Before the feeding of a medium P is started, the separator rollers 36 may be rotated for a certain distance. This manner of control can eliminate backlash in a motive power transmitting mechanism (not depicted) for the separator rollers 36 and shorten the amount of time required before the separator rollers 36 appropriately deliver medium-separating performance. Therefore, the multi-feed of media P can be inhibited.

(3) Before the feeding of a medium P is started, the feed rollers 34 may be rotated for a certain distance so as to co-rotate the separator rollers 36 that are in contact with the feed rollers 34. This can eliminate backlash in the motive power transmitting mechanism (not depicted) for the separator rollers 36 and shorten the amount of time required before the separator rollers 36 appropriately deliver medium-separating performance. Therefore, the multi-feed of media P can be inhibited.

(4) Although in the exemplary embodiment, a control is performed such as to stop rotating the feed rollers 34, the separator rollers 36, and the transport roller pairs 46 (driving transport rollers 46a) once at the time t22 and re-drive these rollers at the time t23 as illustrated in FIG. 20, this control may be replaced by such a control as to switch the speeds of the feed rollers 34, the separator rollers 36, and the transport roller pairs 46 (driving transport rollers 46a) from the first speeds Vf1, Vr1, and Vpf1 to the second speeds Vf2, Vr2, and Vpf2 in the period from the time t23 to the time t24.

The foregoing description can be summarized as follows. The scanner 10 includes the medium mount portion 16a on which one or more media P are mounted, the feed rollers 34 that feed the media P from the medium mount portion 16a, the separator rollers 36 that face the feed rollers 34 and that separate the media P, the transport roller pairs 46 that are provided at the downstream side of the feed rollers 34 and the separator rollers 36 and that transport the media P, the image scanning portion 50 that is provided at the downstream side of the transport roller pairs 46 and that scans the media P, and the control portion 30 that controls the feed rollers 34 and the transport roller pairs 46. When a plurality of media P are consecutively fed, the control portion 30, according to the length L2 of a first medium P1, a preceding medium, that is a dimension thereof in the feed direction, changes a feed control for feeding a second medium P2 that succeeds the first medium P1 by using the feed rollers 34.

According to this configuration, when a plurality of media P are consecutively fed, the control portion 30 that controls the feed rollers 34 and the transport roller pairs 46 changes the feed control for feeding the succeeding second medium P2 by using the feed rollers 34, according to the length L2 of the preceding first medium P1 in the feed direction. Therefore, it is possible to inhibit a failure in adjustment of the document interval associated with different lengths of documents and therefore appropriately adjust the document interval while improving throughput.

Where the feed speed of a medium P by the feed rollers 34 before the leading end of the medium P passes the separator rollers 36 is represented by speed Va and the feed speed of the medium P by the feed rollers 34 after the leading end of the medium P passes the separator rollers 36 is represented by speed Vb, the control portion 30 is capable of executing the first feed control that sets the speed Vb to a speed Vb1 that is higher than the speed Va when the length L2 of the first medium P1 in the feed direction is greater than a predetermined length L and the second feed control that sets the speed Vb to a speed Vb2 that is lower than the speed Vb1 when the length L2 of the first medium P1 in the feed direction is less than or equal to the length L.

According to this configuration, since the control portion 30 is capable of executing the first feed control that sets the speed Vb to the speed Vb1 that is higher than the speed Va when the length L2 of the first medium P1 in the feed direction is greater than the predetermined length L and the second feed control that sets the speed Vb to the speed Vb2 that is lower than the speed Vb1 when the length L2 of the first medium P1 in the feed direction is less than or equal to the length L, the control portion 30 can appropriately control the document interval by selecting the second feed control when the length L2 of the first medium P1 in the feed direction is less than or equal to the length L.

The scanner 10 further includes the first detection unit 42 that is provided on the medium transport path 26 between the feed rollers 34 and the transport roller pairs 46 and that detects the media P and the second detection unit 48 that is provided on the medium transport path 26 on the downstream side of the transport roller pairs 46 and that detects the media P. The control portion 30 calculates the length L2 of the first medium P1 in the feed direction on the basis of the amount by which the first medium P1 provided in a period from when the leading end of the first medium P1 is detected by the second detection unit 48 to when the tailing end of the first medium P1 is detected by the first detection unit 42 and the path length L1 between the first detection unit 42 and the second detection unit 48.

According to this configuration, the control portion 30 calculates the length L2 of the first medium P1 in the feed direction on the basis of the amount by which the first medium P1 is transported in a period from when the leading end of the first medium P1 is detected by the second detection unit 48 to when the tailing end of the first medium P1 is detected by the first detection unit 42 and the path length L1 between the first detection unit 42 and the second detection unit 48, it is possible to more accurately control the interval between a preceding document and the succeeding document.

The length L is set according to the size of the short side of a card prescribed by International Standard Organization ISO/IEC 7810 ID-1.

The scanner 10 includes the medium mount portion 16a on which one or more media P are mounted, the feed rollers 34 that feed the media P from the medium mount portion 16a, the separator rollers 36 that face the feed rollers 34 and that separate the media P, the transport roller pairs 46 that are provided at the downstream side of the feed rollers 34 and the separator rollers 36 and that transport the media P, the image scanning portion 50 that is provided at the downstream side of the transport roller pairs 46 and that scans the media P, and the control portion 30 that controls the feed rollers 34 and the transport roller pairs 46. When a plurality of media P are consecutively fed, the control portion 30, according to a characteristic of a first medium P1 that is a preceding medium, changes a feed control for feeding a second medium P2 that succeeds the first medium P1 by using the feed rollers 34.

According to this configuration, when a plurality of media P are consecutively fed, the control portion 30 that controls the feed rollers 34 and the transport roller pairs 46 changes the feed control for feeding the succeeding second medium P2 by using the feed rollers 34, according to the characteristic of the preceding first medium P1. Therefore, it is possible to inhibit a failure in adjustment of the document interval associated with differences in the characteristic between documents and therefore appropriately adjust the document interval while improving throughput.

Where the feed speed of a medium P by the feed rollers 34 before the leading end of the medium P passes the separator rollers 36 is represented by speed Va and the feed speed of the medium P by the feed rollers 34 after the leading end of the medium P passes the separator rollers 36 is represented by speed Vb, the control portion 30 is capable of executing the first feed control that sets the speed Vb to a speed Vb1 that is higher than the speed Va when the thickness of the first medium P1 is greater than a predetermined thickness t and the second feed control that sets the speed Vb to a speed Vb2 that is lower than the speed Vb1 when the thickness of the first medium P1 is less than or equal to the thickness t.

According to this configuration, since the control portion 30 is capable of executing the first feed control that sets the speed Vb to the speed Vb1 that is higher than the speed Va when the thickness of the first medium P1 is greater than the predetermined thickness t and the second feed control that sets the speed Vb to the speed Vb2 that is lower than the speed Vb1 when the thickness of the first medium P1 is less than or equal to the thickness t, the control portion 30 can appropriately control the document interval by selecting the second feed control when the thickness of the first medium P1 is less than or equal to the thickness t.

It should be apparent that the invention is not limited to the foregoing exemplary embodiments but may be changed or modified in various manners within the scope of the invention described in the appended claims and such changes and modifications are encompassed within the scope of the invention.

The entire disclosure of Japanese Patent Application No. 2017-000919, filed Jan. 6, 2017, is expressly incorporated by reference herein.

What is claimed is:

1. An image scanning apparatus comprising:
a medium mount portion on which one or more media are mounted;
a feeder that feeds the media from the medium mount portion;
a separator that faces the feeder and that separates the media;
a transporter that is provided at a downstream side of the feeder and the separator and that transports the media;
a scanner that is provided at the downstream side of the transporter unit and that scans the media; and
a controller that controls the feeder and the transporter,
wherein when a plurality of media are fed, the controller calculates a length of a first medium that is a preceding medium after the first medium is separated from the rest of the media by the separator, the length being a dimension of the first medium in a feed direction, and changes a feed speed for feeding a second medium that succeeds the first medium by using the feeder according to the length of the first medium that has been calculated, the controller repeatedly calculating the length of the first medium and changing the feed speed for feeding the second medium for each of pairs of the first medium and the second medium of the plurality of media.

2. The image scanning apparatus according to claim 1, wherein a feed speed of a medium by the feeder before a leading end of the medium passes the separator is a speed Va and a feed speed of the medium by the feeder after the leading end of the medium passes the separator is a speed Vb, and
wherein the controller sets the speed Vb to a speed Vb1 that is higher than the speed Va when the length of the first medium in the feed direction is greater than a predetermined length L, and sets the speed Vb to a speed Vb2 that is lower than the speed Vb1 when the length of the first medium in the feed direction is less than or equal to the length L.

3. The image scanning apparatus according to claim 2, further comprising:
a first detector that is provided on the medium transport path between the feeder and the transporter and that detects a medium; and
a second detector that is provided on the medium transport path at the downstream side of the transporter and that detects the medium,
wherein the controller calculates the length of the first medium in the feed direction based on an amount of transport of the first medium in a period from when the leading end of the first medium is detected by the second detector to when a tailing end of the first medium is detected by the first detector and a path length between the first detector and the second detector.

4. The image scanning apparatus according to claim 2, wherein the length L is set according to a size of a short side of a card prescribed by International Standard Organization ISO/IEC 7810 ID-1.

5. An image scanning apparatus comprising:
a medium mount portion on which one or more media are mounted;
a feeder that feeds the media from the medium mount portion;
a separator that faces the feeder and that separates the media;
a transporter that is provided at a downstream side of the feeder and the separator and that transports the media;
a scanner that is provided at the downstream side of the transporter and that scans the media; and
a controller that controls the feeder and the transporter,
wherein when a plurality of media are fed, the controller calculate a dimensional characteristic of a first medium that is a preceding medium after the first medium is separated from the rest of the media by the separator, and changes a feed speed for feeding a second medium that succeeds the first medium by using the feeder according to the dimensional characteristic of the first medium that has been calculated, the controller repeatedly calculating the dimensional characteristic of the first medium and changing the feed speed for feeding the second medium for each of pairs of the first medium and the second medium of the plurality of media.

6. The image scanning apparatus according to claim 5, wherein a feed speed of a medium by the feeder before a leading end of the medium passes the separator is a speed Va and a feed speed of the medium by the feeder after the leading end of the medium passes the separator is a speed Vb, and wherein the controller sets the speed Vb to a speed Vb1 that is higher than the speed Va when a thickness of the first medium is greater than a predetermined thickness t, and sets the speed Vb to a speed Vb2 that is lower than the speed Vb1 when the thickness of the first medium is less than or equal to the thickness t.

7. An image scanning apparatus comprising:
a medium mount portion on which one or more media are mounted;
a feeder that feeds the media from the medium mount portion;
a separator that faces the feeder and that separates the media;
a transporter that is provided at a downstream side of the feeder and the separator and that transports the media;
a scanner that is provided at the downstream side of the transporter unit and that scans the media; and
a controller that controls the feeder and the transporter,
wherein when a plurality of media are fed, the controller calculates a length of a first medium that is a preceding medium, the length being a dimension of the first medium in a feed direction, and changes a feed speed for feeding a second medium that succeeds the first medium by using the feeder according to the length of the first medium that has been calculated,
wherein a feed speed of a medium by the feeder before a leading end of the medium passes the separator is a speed Va and a feed speed of the medium by the feeder after the leading end of the medium passes the separator is a speed Vb,
wherein the controller executes a first feed control and a second feed control, the first feed control sets the speed Vb to a speed Vb1 that is higher than the speed Va when the length of the first medium in the feed direction is greater than a predetermined length L, and the second feed control sets the speed Vb to a speed Vb2 that is lower than the speed Vb1 when the length of the first medium in the feed direction is less than or equal to the length L, and
wherein the first feed control is a control of performing a process in which the feed speed is temporarily increased in order to shorten an interval between a tailing end of the preceding medium and a leading end of the succeeding medium, and the second feed control is a control of performing a process in which the speed increasing process is not performed or the feed speed is increased to a level lower than in the first feed control.

* * * * *